US009087144B2

(12) United States Patent
Kanamori

(10) Patent No.: US 9,087,144 B2
(45) Date of Patent: Jul. 21, 2015

(54) INFORMATION PROCESSING APPARATUS AND INFORMATION PROCESSING METHOD FOR DISPLAYING STATUS OF A PRINTER IN AN OPERATING SYSTEM

(75) Inventor: Hideyuki Kanamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 12/848,951

(22) Filed: Aug. 2, 2010

(65) Prior Publication Data

US 2011/0035625 A1 Feb. 10, 2011

(30) Foreign Application Priority Data

Aug. 4, 2009 (JP) ................................ 2009-181856

(51) Int. Cl.
*G06F 11/32* (2006.01)
*G06F 11/07* (2006.01)

(52) U.S. Cl.
CPC .......... *G06F 11/327* (2013.01); *G06F 11/0733* (2013.01); *G06F 11/0769* (2013.01); *G06F 11/0781* (2013.01)

(58) Field of Classification Search
CPC ............ G06F 11/0733; G06F 11/0769; G06F 11/0781; G06F 11/327
USPC .................... 358/1.14-1.16; 710/19; 715/772
See application file for complete search history.

(56) References Cited

U.S. PATENT DOCUMENTS

| | | | | |
|---|---|---|---|---|
| 6,252,681 | B1 * | 6/2001 | Gusmano et al. | 358/468 |
| 6,341,907 | B1 * | 1/2002 | Katsuyoshi | 400/582 |
| 6,612,759 | B2 * | 9/2003 | Fukano et al. | 400/74 |
| 6,894,792 | B1 * | 5/2005 | Abe | 358/1.15 |
| 6,987,578 | B2 * | 1/2006 | Alexander | 358/1.15 |
| 7,224,477 | B2 * | 5/2007 | Gassho et al. | 358/1.14 |
| 7,265,855 | B2 * | 9/2007 | Patton | 358/1.15 |
| 7,400,420 | B2 * | 7/2008 | Kageyama et al. | 358/1.13 |
| 2003/0208607 | A1 * | 11/2003 | Yamazaki | 709/229 |
| 2007/0188791 | A1 * | 8/2007 | Utsunomiya et al. | 358/1.13 |

FOREIGN PATENT DOCUMENTS

| | | |
|---|---|---|
| JP | H01-295305 A | 11/1989 |
| JP | 2004-038659 | 2/2004 |

* cited by examiner

*Primary Examiner* — Benny Q Tieu
*Assistant Examiner* — Quyen V Ngo
(74) *Attorney, Agent, or Firm* — Canon USA Inc. IP Division

(57) ABSTRACT

In an information processing apparatus for storing, based on a notification sent from a monitor unit used for monitoring a state of print processing of a printing apparatus, the status item presenting the state in a storage region, or deleting the status item stored in the storage region, and for displaying the status item stored in the storage region in a storage order, a monitor unit acquires a plurality of the status items stored in the storage region, compares priority of the acquired plurality of status items and priority of a new status item stored in the storage region, and notifies a control unit to store the status items in the storage region in an order based on priority obtained as a result of the comparison.

22 Claims, 28 Drawing Sheets

| STATUS | PRIORITY |
|---|---|
| "NO INK" ERROR | 1 |
| "PRINTER COVER OPEN" ERROR | 2 |

| STATUS | PRIORITY |
|---|---|
| "NO INK" ERROR | 2 |
| "PRINTER COVER OPEN" ERROR | 3 |
| "NO PRINT HEAD" ERROR | 1 |

FIG.12

| STATUS | PRIORITY | NOTIFICATION SOURCE |
|---|---|---|
| COMMUNICATION ERROR | 1 | BACK END |
| INTERNAL MECHANISM ERROR | 2 | DRIVER |
| PRINT DATA TRANSMISSION TIME-OUT | 3 | BACK END |
| PAPER JAM | 4 | DRIVER |
| NO PRINT HEAD | 5 | DRIVER |
| NO INK | 6 | DRIVER |
| PRINTER COVER OPEN | 7 | DRIVER |
| NO PAPER | 8 | DRIVER |
| DATA TRANSMISSION BLOCK | 9 | BACK END |
| LOW INK LEVEL | 10 | DRIVER |

| STATUS | NOTIFICATION SOURCE |
|---|---|
| LOW INK LEVEL (BLACK INK) WARNING | DRIVER |
| PRINT DATA TRANSMISSION TIME-OUT | BACK END |
| LOW INK LEVEL (CYAN INK) WARNING | DRIVER |

| STATUS | NOTIFICATION SOURCE |
|---|---|
| "NO BLACK INK" ERROR | DRIVER |
| "DATA TRANSMISSION BLOCKING" ERROR | BACK END |
| "NO CYAN INK" ERROR | DRIVER |

| STATUS STORAGE BUFFER |
| --- |
| STATUS 1: NO BLACK INK.<br>STATUS 2: DATA TRANSMISSION IS NOT COMPLETED. PLEASE WAIT.<br>STATUS 3: NO CYAN INK. |

| STATUS | PRIORITY |
|---|---|
| "NO INK" ERROR | 2 |
| "PRINTER COVER OPEN" ERROR | 3 |
| PRINT DATA TRANSMISSION TIME-OUT | 1 |

INFORMATION PROCESSING APPARATUS AND INFORMATION PROCESSING METHOD FOR DISPLAYING STATUS OF A PRINTER IN AN OPERATING SYSTEM

BACKGROUND OF THE INVENTION

1. Field of the Invention

The present invention relates to an information processing apparatus and an information processing method.

2. Description of the Related Art

Conventionally, regarding a printing system including a host computer and a printing apparatus, a printer driver installed in the host computer includes a function that allows generation of print data and transmission of the generated print data to the printing apparatus. Further, according to the printer driver discussed in Japanese Patent Application Laid-Open No. 2004-038659, the printer driver acquires a status of a printer in the printing operation and displays the status on a display of the host computer.

Regarding a method used by a driver for displaying a status of a printer on a display of a host computer, Mac® OS X (hereinafter simply referred to as OS), for example, has a function to display a printer status, and when a driver notifies the OS of a printer status, the status is displayed in a dialog box.

In other words, the OS includes a buffer used for storing the status to be displayed in the dialog box. When the driver notifies the OS of the printer status, the status is stored in the buffer, and then, the status is displayed in the dialog box by the OS. If the driver notifies the OS to clear the status displayed in the dialog box, the OS deletes the status from the buffer and further clears the status from the dialog box.

However, there are problems to be addressed with the above-described conventional technique.

First, the buffer used in storing the status of the OS can store a plurality of status items. The stored status items are displayed in the dialog box in the order of storage. If the driver detects an error during the printing operation and notifies the OS of the error, and further detects another error and notifies the OS again of the status, the OS stores the status items in the order they are notified, and displays them in the dialog box in that order. Thus, the driver is unable to display the error status according to its priority.

Second, during the printing operation, not only the driver but also other modules notify the OS of their status. The status items are stored in a buffer to be used for storing the status of the OS in the order they are notified. The stored status items are displayed in the dialog box in the order they are stored. At that time, the notification source of the status is not considered in the order the items are displayed. After the driver notifies the OS of an error status, if another module notifies the OS of its status, and further, if the driver notifies the OS of a different status, then the OS stores the status items in the order they are notified, and displays them in the dialog box in that order. Thus, the status of the driver and the other module may be displayed in the dialog box in a mixed manner.

Third, even after the print processing is completed, the status that remains in the buffer where the status of the OS is stored will be continuously displayed in the dialog box. Accordingly, an error status, which is cancelled when the printing is completed, maybe continuously displayed even after the print processing is completed.

SUMMARY OF THE INVENTION

The present invention is directed to an information processing apparatus capable of appropriately displaying a status of a printing apparatus, and an information processing method.

According to an aspect of the present invention, an information processing apparatus includes a control unit configured to, based on a notification sent from a monitor unit used for monitoring a state of print processing of a printing apparatus, store a status item presenting the state in a storage region, or delete the status item stored in the storage region, and a display unit configured to display the status item stored in the storage region in a storage order, wherein the monitor unit is configured to acquire a plurality of the status items stored in the storage region, compare priority of the acquired plurality of status items and priority of a new status item to be stored in the storage region, and notify the control unit to store the status items in the storage region in an order determined based on priority obtained as a result of the comparison.

According to another aspect of the present invention, an information processing apparatus includes a control unit configured to, based on a notification sent from a plurality of monitor units used for monitoring a state of print processing of a printing apparatus, and store a status item presenting the state in a storage region, or delete the status item stored in the storage region, and a display unit configured to display the status item stored in the storage region in a storage order, wherein the monitor unit is configured to acquire a plurality of the status items stored in the storage region, and notify the control unit to store the status items in the storage region in an order based on a monitor unit of a notification source which notified the control unit to store each of the acquired status item.

According to yet another aspect of the present invention, an information processing apparatus includes a control unit configured to, based on a notification sent from a monitor unit used for monitoring a state of print processing of a printing apparatus, store a status item presenting the state in a storage region, or delete the status item stored in the storage region, and a display unit configured to display the status item stored in the storage region in a storage order, wherein the monitor unit is configured to acquire a plurality of the status items stored in the storage region, compare priority of the acquired plurality of status items, and notify the control unit to store the status items in the storage region in an order based on priority obtained as a result of the comparison.

According to yet another aspect of the present invention, an information processing apparatus includes a control unit configured to, based on a notification sent from a monitor unit used for monitoring a state of print processing of a printing apparatus, store a status item presenting the state in a storage region, or delete the status item stored in the storage region, and a display unit configured to display the status item stored in the storage region in a storage order, a monitor unit configured to acquire a plurality of the status items stored in the storage region, determine whether the acquired plurality of status items are necessary after the print processing is completed, and, if the status item is determined as unnecessary after the print processing is completed, notifies the control unit to delete the status item from the storage region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an example of a priority management table.

DESCRIPTION OF THE EMBODIMENTS

Various exemplary embodiments, features, and aspects of the invention will be described in detail below with reference to the drawings.

Figure 1A:
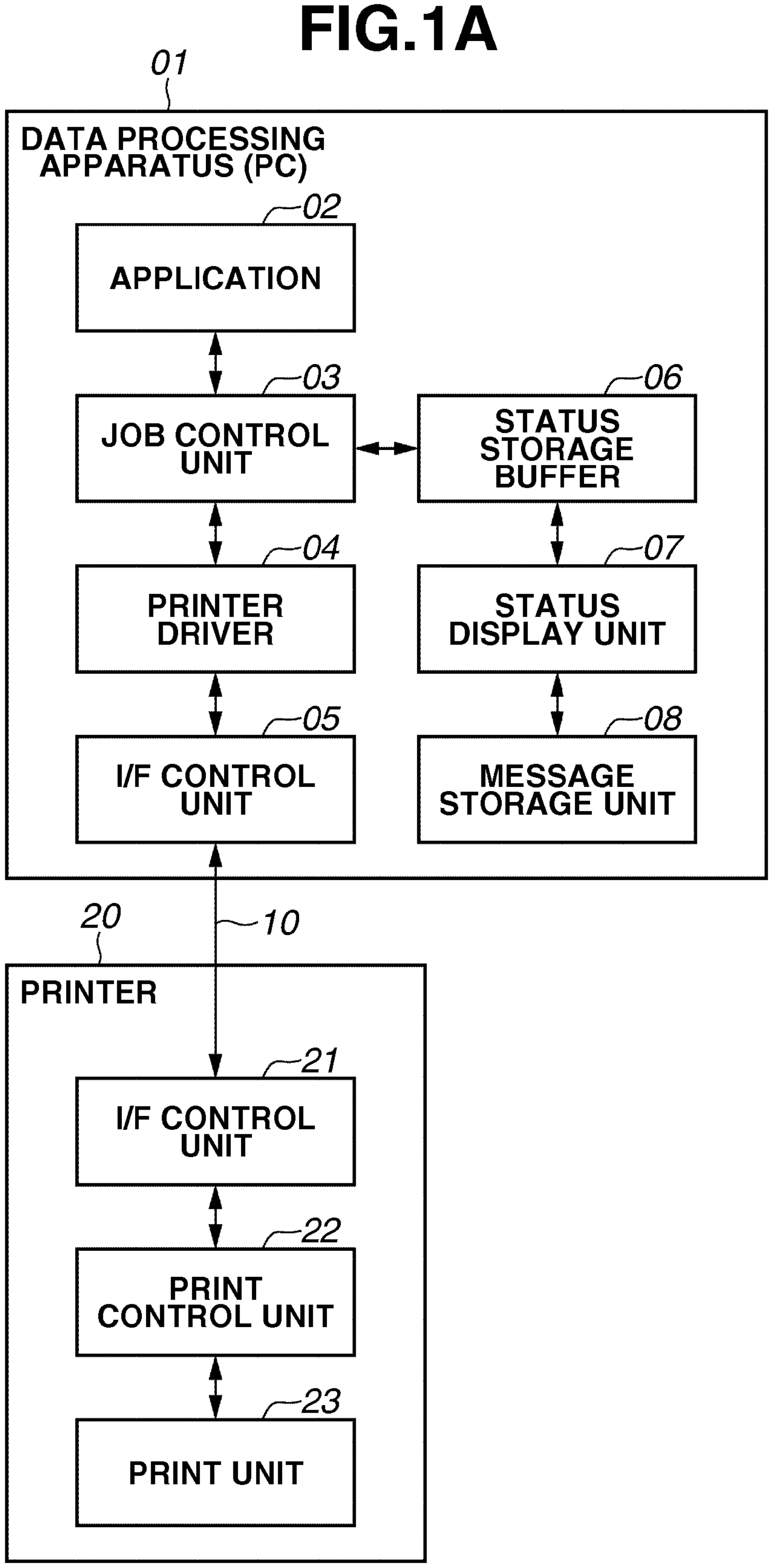
FIGS. 1A and 1B are block diagrams illustrating an example of a system configuration of a printing system.
Figure 1B:
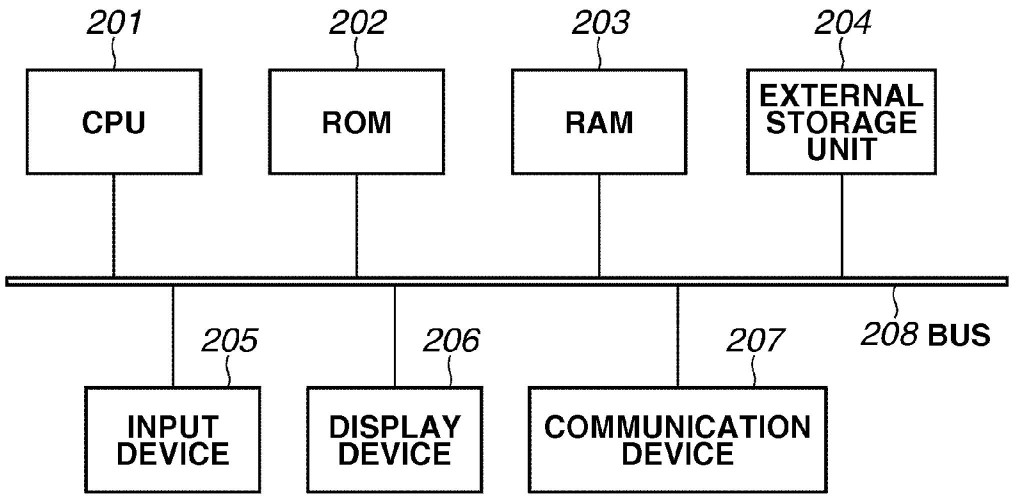

FIGS. 1A and 1B are block diagrams illustrating an example of a system configuration of a printing system.

In FIG. 1A, a data processing apparatus 01 controls a printer 20. According to the present exemplary embodiment, the data processing apparatus 01 is a personal computer (PC), and Mac® OS X is installed as an operating system (OS). Although the OS is not illustrated in FIG. 1, resources of the PC, for example, the blocks of the diagram, are managed by the OS.

As illustrated in FIG. 1B, the PC includes a hardware configuration of a general information processing apparatus. A central processing unit (CPU) 201 is a processing apparatus that performs calculation processing, and controls each device connected to a bus 208. A read-only memory (ROM) 202 is a memory dedicated to data reading. A basic control program is stored in the ROM 202. A random access memory (RAM) 203 is a data read/write memory, and used as a temporary storage of various types of calculation processing and data for the CPU 201.

An external storage unit 204 stores a system program of the OS and a program of a printer driver. The input/output of data of the external storage unit 204 takes time compared to the RAM 203, however it can store a large volume of data. A magnetic storage unit (hard disk drive (HDD)) is mainly used as the external storage unit 204, however, an apparatus using an external medium in reading/recording data may also be used. The external medium is, for example, a compact disc (CD), a digital versatile disc (DVD), or a memory card.

An input device 205, which is, for example, a keyboard or a mouse, is used for inputting character or data. A display device 206 is a device used for displaying a processing result of the PC. A CRT or liquid crystal monitor is used as the display device 206. A communication device 207 is connected to a local area network (LAN), and performs data communication using TCP/IP. The communication device 207 is used when the PC communicates with a printing apparatus (e.g., the printer 20).

The PC includes an application 02, a job control unit 03, a printer driver 04, an interface (I/F) control unit 05, a status storage buffer 06, a status display unit 07, and a message storage unit 08. The present exemplary embodiment is on the assumption that CUPS (Common UNIX® Printing System), which is included in Mac OS X, is used as the print control system of the OS.

The job control unit 03, the status storage buffer 06, and the status display unit 07 are controlled by the OS. Further, the present exemplary embodiment is on the assumption that the I/F control unit 05 communicates with the printer 20 according to CUPS. Similarly, a PostScript Printer Description (PPD) file, which includes description of a printer-supporting function, is used for the message storage unit 08.

The printer driver 04 is an example of a monitor unit that monitors a state of print processing of the printing apparatus. The job control unit 03 is an example of a control unit that stores a status in a storage region, or deletes a status stored in the storage region.

If a user requests printing of data generated by the application, the job control unit 03 receives the data and transmits the data to the printer driver 04. The printer driver 04 converts the received data into print data and transmits the print data to the printer 20 via the I/F control unit 05.

After transmitting the print data, the printer driver 04 monitors the state of the printer 20 until the print processing is completed. While the print processing is being performed, the printer driver 04 notifies the job control unit 03 of the status acquired from the printer 20 via the I/F control unit 05 at regular intervals. Further, if an unnecessary status is detected, the printer driver 04 notifies the job control unit 03 to clear the status.

The job control unit 03 stores the notified status in the status storage buffer 06. The status storage buffer 06 is one example of a status storage unit. If the job control unit 03 receives a notification of the status to be cleared, it removes the corresponding status from the status storage buffer 06.

The status display unit 07 acquires a status item, which is the first status item stored in the status storage buffer 06, acquires a message corresponding to the status item from the PPD file, and displays the message in a status display dialog box. The printer driver 04 displays a message of, for example, a printer error on the status display unit 07 by using the job control unit 03 and the status storage buffer 06.

A communication interface 10 illustrated in FIG. 1A connects the PC 01 and the printer 20. The present exemplary embodiment is on the assumption that the communication interface is a local interface (i.e., a Universal Serial Bus (USB)).

The printer 20 includes an I/F control unit 21, a print control unit 22, and a print unit 23. The printer 20 receives print data and control commands, and transmits a printer status via the I/F control unit 21. The print control unit 22 controls the print unit 23 according to the print data and the control commands transmitted from the PC 01.

Figure 2A:
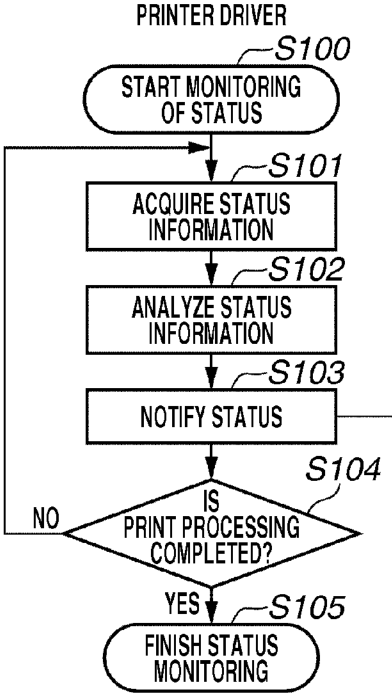
FIGS. 2A to 2C are flowcharts illustrating processing from a notification to display of a status.
Figure 2B:
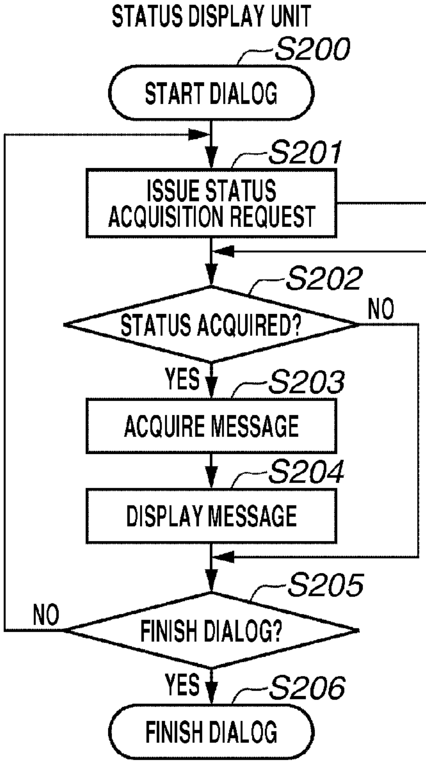
Figure 2C:
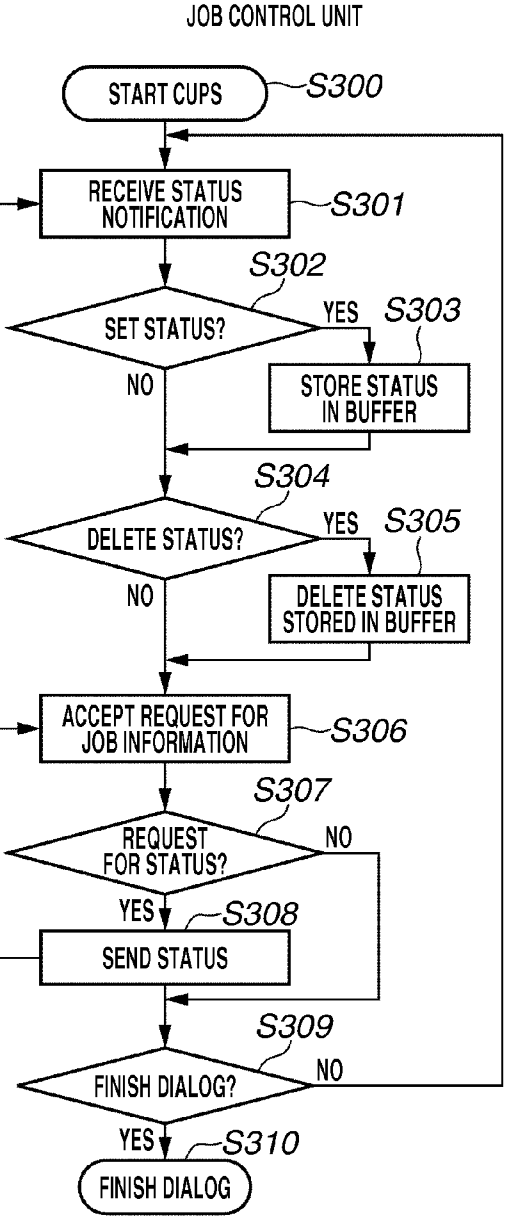

FIGS. 2A to 2C are flowcharts illustrating processing from a notification to display of a status.

FIG. 2A illustrates processing performed by the printer driver 04. FIG. 2B illustrates processing performed by the status display unit 07. FIG. 2C illustrates processing performed by the job control unit 03.

In step S100, when processing of a print job is started, the printer driver 04 starts monitoring the status of the printer 20. In step S101, the printer driver 04 acquires status information from the printer 20. In step S102, the printer driver 04 analyzes the status information. In step S103, the printer driver 04 notifies the job control unit 03 of the printer status.

In step S104, the printer driver 04 determines whether the print processing of the printer 20 has been completed. If the printer driver 04 determines that the print processing has been completed (YES in step S104), the printer driver 04 finishes the monitoring of the status. If not (NO in step S104), the processing returns to step S101, and the printer driver 04 continues the monitoring.

In step S200, the status display dialog box is opened. In step S201, the status display unit 07 issues a status information acquisition request to the job control unit 03.

In step S202, the status display unit 07 determines whether the status information is acquired. If the status information is acquired (YES in step S202), the processing proceeds to step S203. If the status information is not acquired (NO in step S202), the processing proceeds to step S205. In step S203, the status display unit 07 acquires a message corresponding to the first status item that has been notified. The message is acquired from a PPD file. In step S204, the status display unit 07 displays the message in the dialog box. In step S205, whether the user has selected a button used for closing the dialog box is determined. If the user is determined to have selected the button (YES in step S205), then the processing proceeds to step S206 and the processing ends. If it is determined that the user has not selected the button (NO in step S205), the processing returns to step S201.

In step S300, when CUPS is started according to the processing of the print job, the job control unit 03 starts the management of the status. While the print job is being processed, the job control unit 03 accepts a status notification transmitted from the printer driver 04, and stores the status in the status storage buffer 06.

Further, the job control unit 03 returns the status stored in the status storage buffer 06 according to a request from the status display unit 07. In step S301, the job control unit 03 receives the status notification from the printer driver 04. In step S302, the job control unit 03 determines whether the received notification is a status setting notification. If the notification is a status setting notification (YES in step S302), the processing proceeds to step S303. In step S303, the job control unit 03 stores the notified status item in the status storage buffer 06. On the other hand, in step S302, if the notification is not a status setting notification (NO in step S302), then the processing proceeds to step S304. Instep S304, the job control unit 03 determines whether the received notification is a status clear notification.

If the notification is a status clear notification (YES in step S304), the processing proceeds to step S305. In step S305, the job control unit 03 deletes the notified status item from the status storage buffer 06. On the other hand, if the notification is not a status clear notification (NO in step S304), the processing proceeds to step S306. In step S306, the job control unit 03 accepts a request for job information.

In step S307, the job control unit 03 determines whether the received request is a request for status information. If the request is a request for status information (YES in step S307), the processing proceeds to step S308. If the request is not a request for status information (NO in step S307), the processing proceeds to step S309. In step S308, the job control unit 03 sends the status item stored in the status storage buffer 06 to the source of the request. In step S309, the job control unit 03 determines whether the job has been completed. If the job control unit 03 determines that the job has been completed (YES in step S309), the processing proceeds to step S310, and the processing ends. If the job control unit 03 determines that the job has not been completed yet (NO in step S309), the processing returns to step S301.

Figure 3:
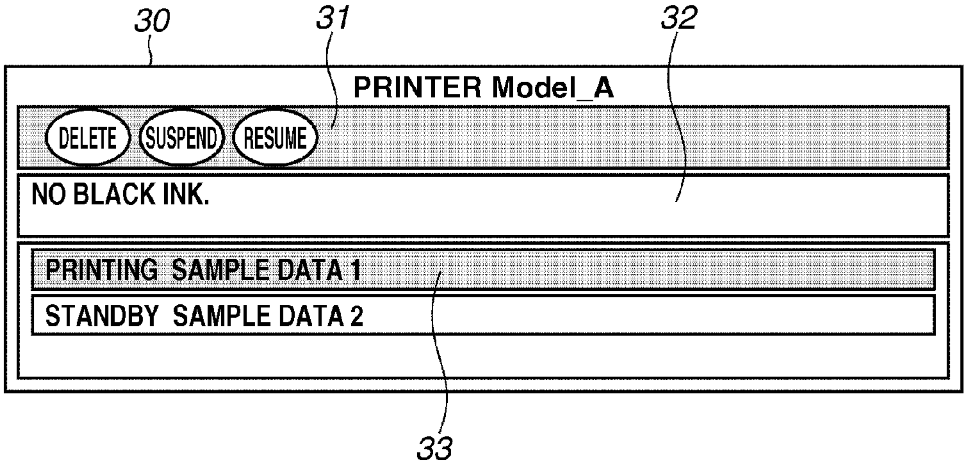
FIG. 3 illustrates an example of a status display dialog box.

FIG. 3 illustrates an example of the status display dialog box.

The dialog box illustrated in FIG. 3 is opened in step S200 of the flowchart in FIG. 2. A delete button, a suspend button, and a resume button are provided in a job control button area 31. By operating each button, the user can delete or suspend a job, or further, resume a suspended job.

A message corresponding to a status item stored in the status storage buffer 06 is displayed in a status display area 32. If a plurality of status items are stored in the status storage buffer 06, a message corresponding to the first status item, which has been stored before, will be displayed.

If the first status item, which has been stored before, is cleared, a message corresponding to the next status item will be displayed. The jobs in the print queue are displayed in a job display area 33.

Figure 4:
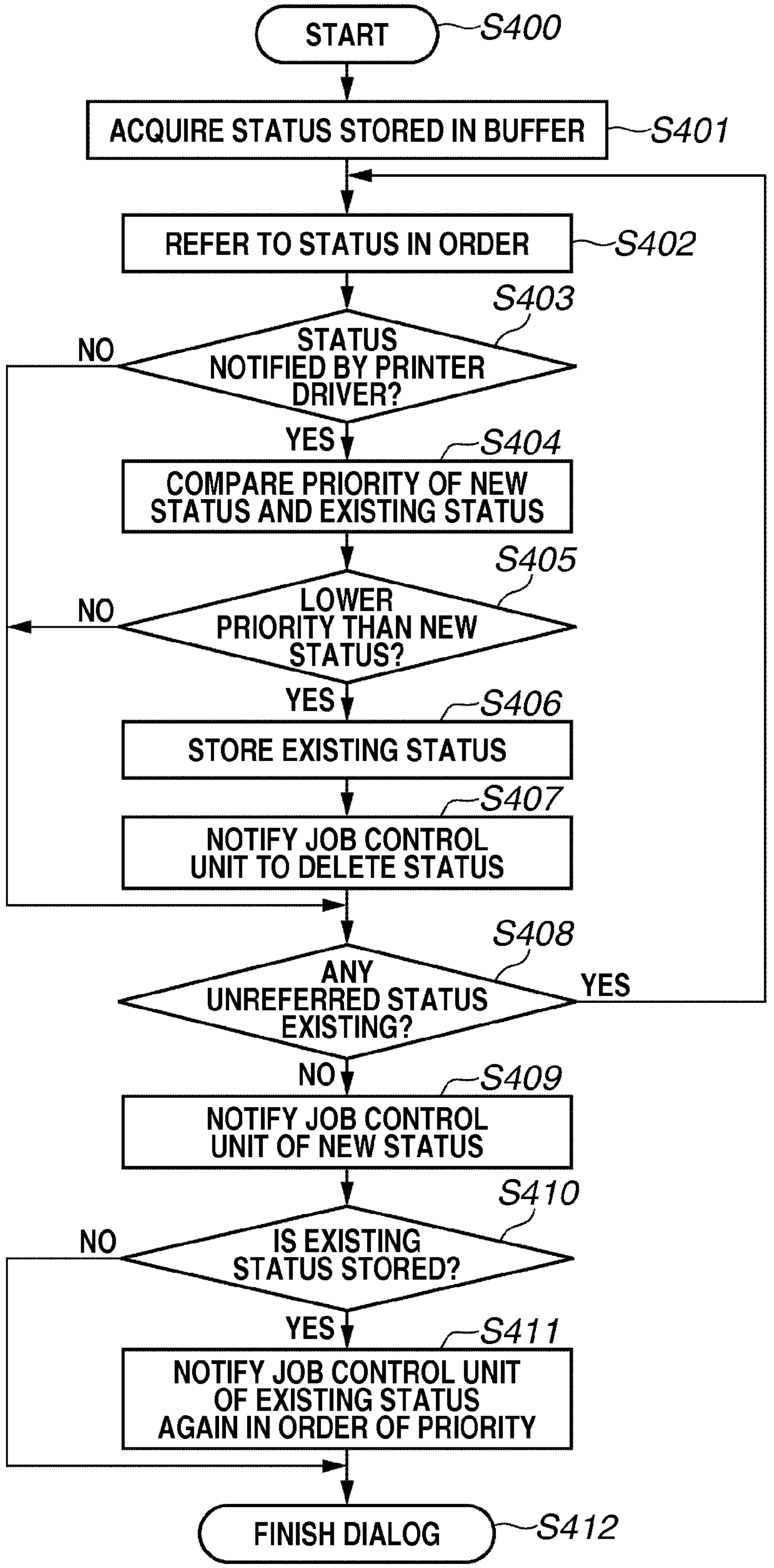
FIG. 4 is a flowchart illustrating details of the processing performed by a printer driver when the printer driver notifies the status in step S103 of the flowchart in FIG. 2A.

FIG. 4 is a flowchart illustrating details of the processing performed by the printer driver 04 when the printer driver notifies the job control unit 03 of the status in step S103 of the flowchart in FIG. 2A.

In step S401, the printer driver 04 acquires the status items (existing status items) stored in the status storage buffer 06. In step S402, the printer driver 04 refers to the existing status items in order. In step S403, the printer driver 04 determines whether the existing status items are the items notified by itself. If the status items are the items notified by the printer driver 04 (YES in step S403), then the processing proceeds to step S404. In step S404, the printer driver 04 compares the existing status items and a new status item to be notified.

The printer driver 04 determines the priority of the status items according to whether the status is a warning, a recoverable error, or an unrecoverable error. If the status is a recoverable error, the priority is determined according to the operation procedures (operation procedure information) necessary in the recovery. The operation procedure information is set according to the error and, for example, the printer driver 04 internally holds the information. Further, the printer driver 04 internally holds information of the priority of the status.

In step 405, the printer driver 04 determines whether the priority of the existing status items is lower than the priority of the new status item. If the printer driver 04 determines that the priority of the existing status items is lower (YES in step S405), the processing proceeds to step S406. In step S406, the printer driver 04 internally holds the existing status items. In step S407, the printer driver 04 notifies the job control unit 03 to delete the existing status items stored in the status storage buffer 06.

In step S408, the printer driver 04 determines whether there is a status item acquired from the status storage buffer 06 and not referred to yet. If the printer driver 04 determines that such a status item exists (YES in step S408), the processing returns to step S402, and the printer driver 04 refers to the next status item.

In step S403, if the printer driver 04 determines that the status items are not the items that notified by the printer driver (NO in step S403), then the processing proceeds to step S408. Similarly, in step S405, if the printer driver 04 determines that the priority of the existing status items is higher than the priority of the new status (NO in step S405), the printer driver 04 does not notify the job control unit to delete the status items, and the processing proceeds to step S408.

In step S408, if the printer driver determines that a status item acquired from the status storage buffer 06 and not referred to yet does not exist (NO in step S408), the processing proceeds to step S409. In step S409, after referring to all the status items acquired from the status storage buffer 06, the printer driver 04 notifies the job control unit 03 of the new status item. In step S410, the printer driver 04 determines whether a status item stored in step S406 exists. If such a status item exists (YES in step S410), the processing proceeds to step S411. In step S411, the printer driver 04 notifies the job control unit 03 again of the stored status item, and then the processing ends in step S412. If a plurality of status items exist, the printer driver 04 notifies the job control unit 03 of the status items in the order of priority. On the other hand, in step S410, if a status item stored in step S406 does not exist (NO in step S410), the processing proceeds to step S412.

According to the present exemplary embodiment, the status display unit 07 acquires the first status item stored in the status storage buffer 06 first, and further acquires a message corresponding to the acquired status item from a PPD file, and displays the message in the status display dialog box.

However, it is also possible to make the status display unit 07 acquire the last status item stored in the status storage buffer 06 at the last, acquire a message corresponding to the acquired status from a PPD file, and display the message in the display dialog box.

In another embodiment, if the status display unit 07 performs such processing, in step S405 in FIG. 4, the printer driver 04 instead of determining whether the priority of the existing status items are lower than the priority of the new status item, it is determining whether the existing status items are higher. If the printer driver 04 determines that the priority of the existing items is higher, the processing proceeds to step S406. In step S411 of the flowchart in FIG. 4, the printer driver 04 may notify the job control unit 03 again of the stored status items in the ascending order.

Figures 5A, 5B:
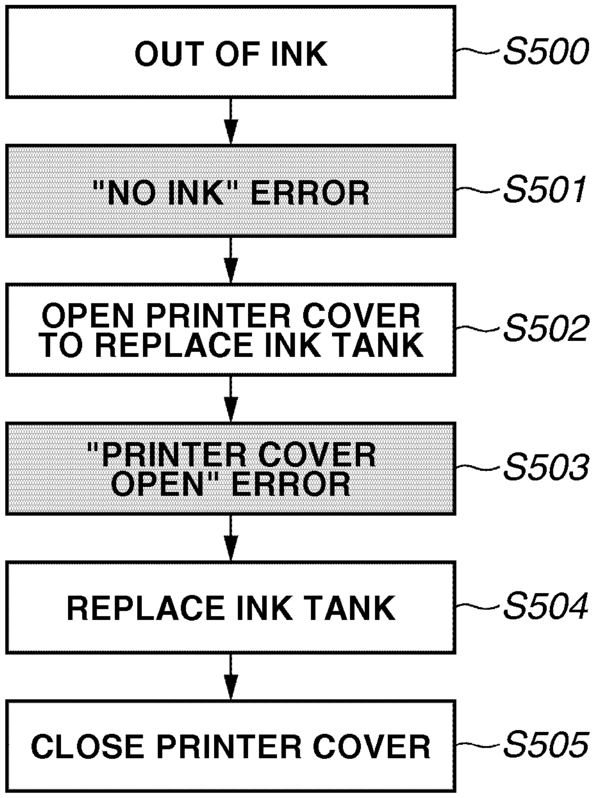
FIGS. 5A and 5B illustrate an example of an operation performed from when an error is detected to when it is cancelled, and priority of the errors.

FIGS. 5A and 5B illustrate an example of processing performed from the detection to the cancellation of errors, and priority of the errors.

In FIGS. 5A and 5B, an error is detected, and then an error of a lower priority is detected. The errors are cancelled in the order of occurrence. FIG. 5A illustrates the operation performed when the errors are detected. FIG. 5B illustrates the priority of the errors.

If ink runs out during printing in step S500, a “no ink” error occurs with the printer 20 in step S501. The user opens the cover of the printer 20 to replace the ink tank in step S502. Then, in addition to the “no ink” error, a “printer cover open” error occurs with the printer 20 in step S503.

Regarding the examples in FIGS. 5A and 5B, the user is assumed to close the cover after the ink tank is replaced. According to this operation procedure, the printer driver 04 determines that the priority of the printer cover open error is lower than the no ink error. Then, the user replaces the ink tank in step S504. After then, the user closes the printer cover in step S505. When the printer cover is closed, the printing is started again. The transition of the status display dialog box and the status storage buffer 06 regarding the operation will be described below.

FIGS. 6A to 6F illustrate an example of the status display dialog box and a state of the status storage buffer 06.

Figure 6A:
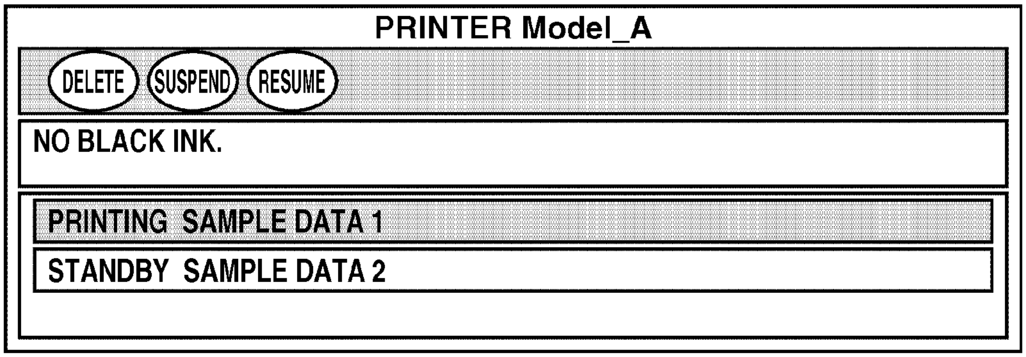
FIGS. 6A to 6F illustrate an example of the status display dialog box and a state of a status storage buffer.
Figure 6B:

FIGS. 6A and 6B illustrate a state of the status display dialog box and a state of the status storage buffer 06 in step S501 in FIG. 5A. The examples in FIGS. 6A to 6F illustrate a case where an “out of black ink” error is detected.

If the “no black ink” error occurs with the printer 20, on receiving a notification of the error from the printer driver 04, the job control unit 03 stores the status item in the status storage buffer 06 (see FIG. 6B). A message corresponding to the status item of the “no black ink” error stored in the status storage buffer 06 is displayed in the message display area (see FIG. 6A).

Figure 6C:
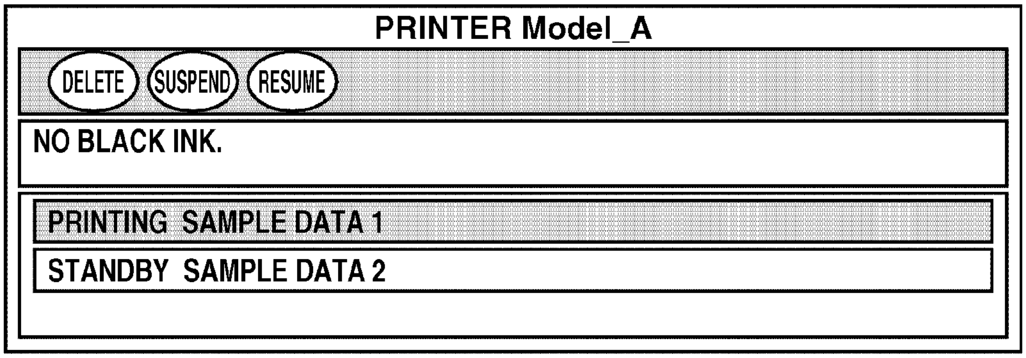
Figure 6D:
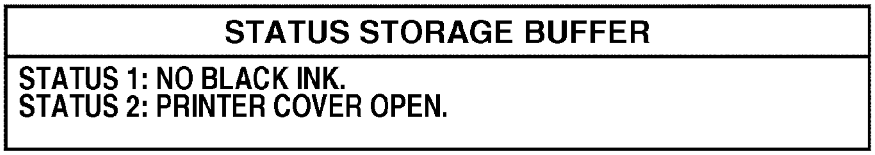

FIGS. 6C and 6D illustrate a state of the status display dialog box and a state of the status storage buffer 06 in step S503 in FIG. 5A. Subsequent to the no ink error of the printer 20, if the “printer cover open” error occurs, the printer driver 04 determines that the priority of the “printer cover open” error is lower than the priority of the “no ink” error.

Then, the printer driver 04 notifies the job control unit 03 of the “printer cover open” error without requesting the job control unit 03 to clear the “no ink” error and without notifying the status again. On receiving the notification of the cover open error, the job control unit 03 stores the status (“printer cover open”) in the status storage buffer 06 (see FIG. 6D). Since the message of the “no black ink” error, which has been notified earlier, is displayed in the message display area, a message corresponding to the “printer cover open” error is not displayed in the message display area (see FIG. 6C).

Figure 6E:
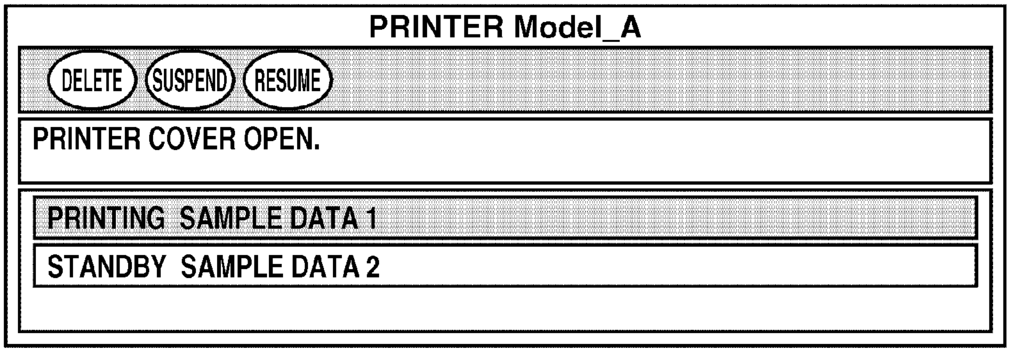
Figure 6F:

FIGS. 6E and 6F illustrate a state of the status display dialog box and a state of the status storage buffer 06 in step S504 in FIG. 5A. When the “no black ink” error is cancelled by the printer 20, the printer driver 04 notifies the job control unit 03 to clear the “no black ink” error.

On receiving the notification from the printer driver 04, the job control unit 03 deletes the "no black ink" error from the status storage buffer 06 (see FIG. 6F). Accordingly, the "printer cover open" error, which is the status following the "no black ink" error stored in the status storage buffer 06, is displayed in the message display area (see FIG. 6E). When the user closes the printer cover according to the message, the "printer cover open" error is cleared and the printing will be continued.

Figures 7A, 7B:
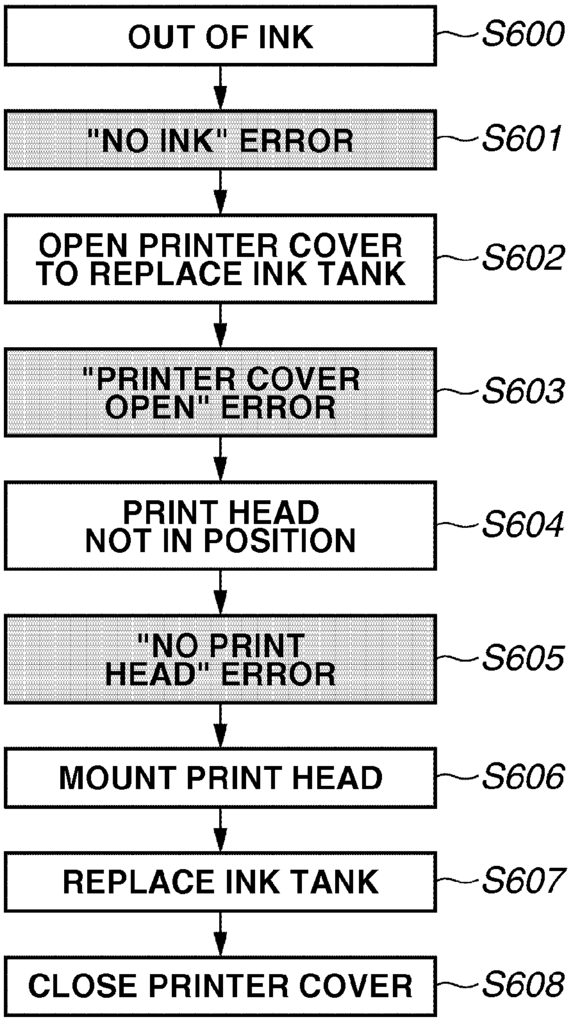
FIGS. 7A and 7B illustrate an example of operation performed from when an error is detected to when it is cancelled, and priority of the errors.

FIGS. 7A and 7B illustrate an example of operation performed from when an error is detected to when it is cancelled, and priority of the errors. In FIGS. 7A and 7B, an error of a higher priority occurs in addition to the errors detected in FIG. 5, and the errors are cancelled in order. FIG. 7A illustrates an operation flow. FIG. 7B illustrates the priority of the errors.

If ink runs out during printing in step S600, the "no ink" error occurs with the printer 20 in step S601. The user opens the cover of the printer 20 to replace the ink tank in step S602. Then, in addition to the "no ink" error, the "printer cover open" error occurs with the printer 20 in step S603. Further, according to the example illustrated in FIG. 7A, the print head is moved out of position while the user replaced the ink tank in step S604.

Accordingly, a "no print head" error occurs with the printer 20 occurs in step S605. The flow illustrated in FIG. 7A is on the assumption that, after the print head is mounted, an ink tank is set on the print head. According to this operation procedure, the printer driver 04 determines that the "no print head" error is given higher priority than the "no ink" error. After then, the user mounts the print head in position in step S606. Subsequently, the user sets the new ink tank on the print head in step S607, and closes the printer cover in step S608. Then the printer continues the printing operation.

The status display dialog box, which is displayed according to the above-described operation, and the transition of the status storage buffer 06 will be described below. Since the status display dialog that is displayed and the transition of the status storage buffer 06 in steps S600 to S603 and S607 to S608 are similar to those described with reference to the operations in FIG. 5, their descriptions are not repeated.

FIGS. 8A to 8D illustrate transition of the status storage buffer 06 from the clearance of the existing status to the renotification of the status when the "no print head" error, which is given high priority, is notified in step S605 in FIG. 7A.

The printer driver 04 detects the occurrence of the "no print head" error while the printer is in the state of the "no ink" error and the "printer cover open" error. If the printer driver 04 detects the "no print head" error, the printer driver 04 internally stores the "no ink" and the "printer cover open" errors, which are given lower priority compared to the "no print head" error, and notifies the job control unit 03 to delete the status items of the "no ink" and the "printer cover open" errors from the status storage buffer 06. On receiving the notification from the printer driver 04, the job control unit 03 deletes the status items from the status storage buffer 06 (see FIG. 8B).

Figures 8A, 8B, 8C, 8D:
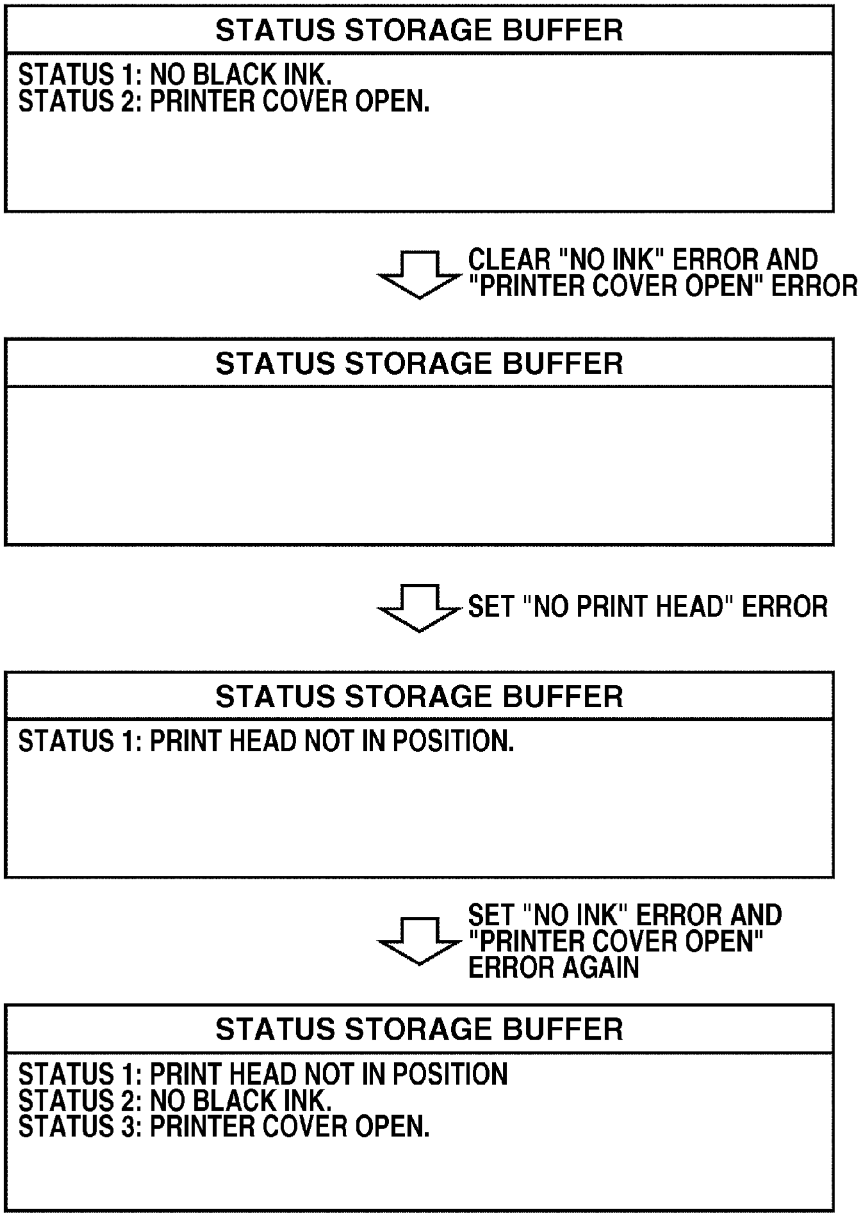
FIGS. 8A to 8D illustrate a transition of the status storage buffer from the clearance of the existing status to the renotification of the status when a "no print head" error, which is given high priority, is notified in S605 in FIG. 7A.

Next, when the printer driver 04 notifies the job control unit 03 of the "no print head", which is given higher priority, the job control unit 03 stores the status item in the status storage buffer 06 (see FIG. 8C). Then, the printer driver 04 notifies the job control unit 03 of the "no ink" error and the "printer cover open" error, which have been stored for a time in the status storage buffer 06, and then deleted. The job control unit 03 stores these status items in the status storage buffer 06 in order (see FIG. 8D).

Figure 9A:
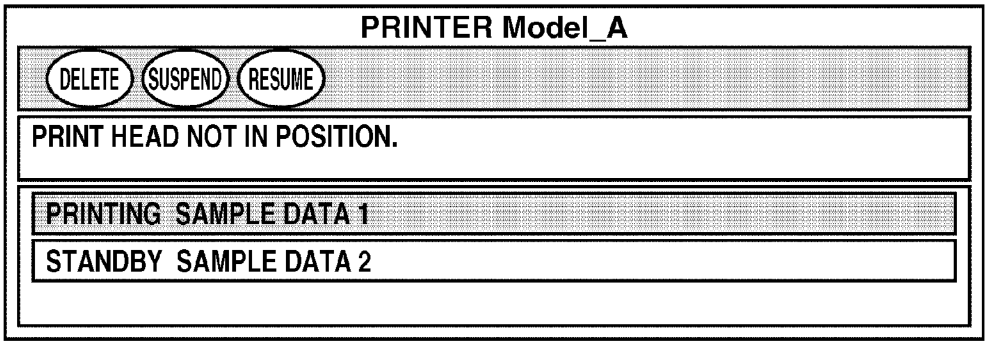
FIGS. 9A to 9D illustrate a state of the status display dialog box and the status storage buffer.
Figure 9B:
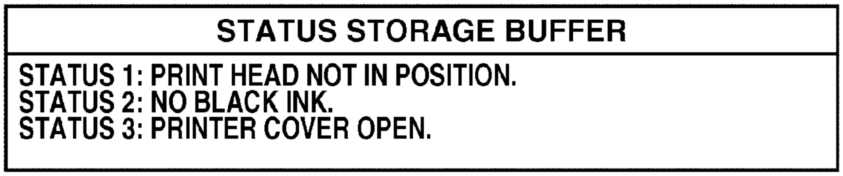
Figure 9C:
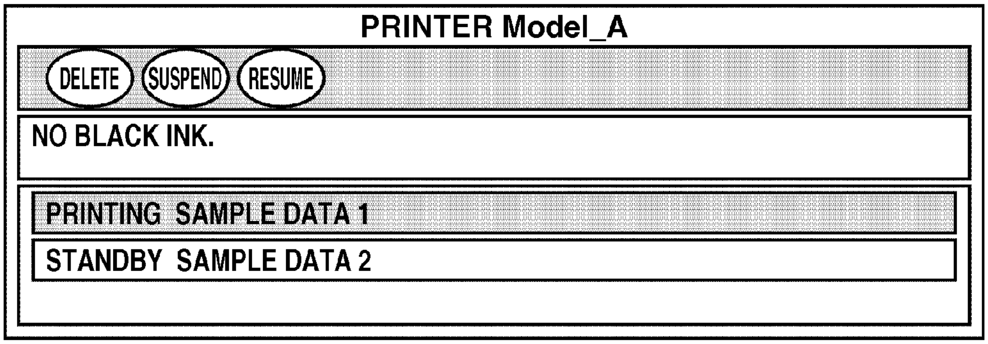

FIGS. 9A, 9B, and 9C illustrate a state of the status display dialog box and the status storage buffer. FIGS. 9A and 9B illustrate a state of the status display dialog box and a state of the status storage buffer 06 in step S605 in FIG. 7A.

After the transition illustrated in FIGS. 8A to 8D, the status items are stored in the status storage buffer 06 in descending order of priority starting from the "no print head" (see FIG. 9B). The "no print head" error, which is given higher priority, is displayed in the message display area (see FIG. 9A).

Figure 9D:
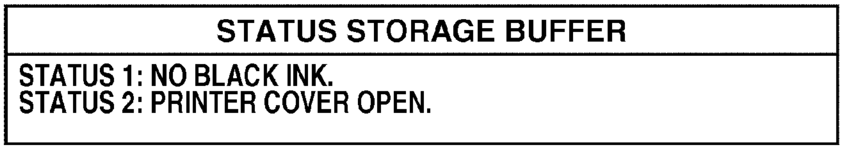

FIGS. 9C and 9D illustrate a state of the status display dialog box and the status storage buffer 06 in step S606 in FIG. 7A. If the "no print head" error is cancelled by the printer 20, the printer driver 04 notifies the job control unit 03 to delete the "no print head" error from the status storage buffer 06.

On receiving the notification from the printer driver 04, the job control unit 03 deletes the "no print head" error from the status storage buffer 06 (see FIG. 9D). Thus, the message of the "no print head" will no longer be displayed in the message display area, and the message of the "no ink" being the message for the next status item stored in the status storage buffer 06 will be displayed (see FIG. 9C).

As described above, according to the present exemplary embodiment, when a new status item is notified, the new status item and the status items already stored in the status storage buffer 06 can be compared and stored in the storage buffer 06 in descending order of priority. In this manner, messages are displayed in the status display dialog box in descending order of priority. In other words, according to the present exemplary embodiment, the status items can be displayed in the dialog box according to priority, and the user is able to know the status in the order of importance.

Next, a second exemplary embodiment of the present invention will be described. Since the configuration of the printing system, the processing of the status display unit 07, and the status display dialog box are similar to those described in the first exemplary embodiment, their descriptions are not repeated.

Figure 10A:
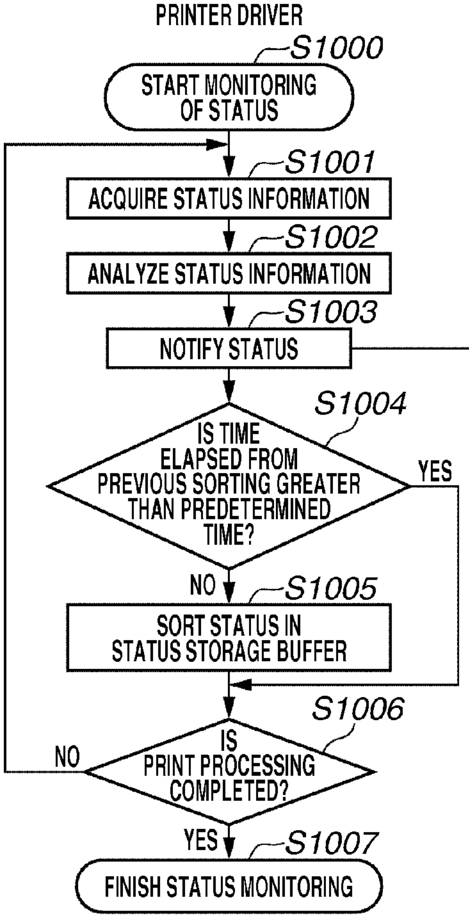
FIGS. 10A to 10C are flowcharts illustrating processing from a notification to storage of a status item.
Figure 10B:
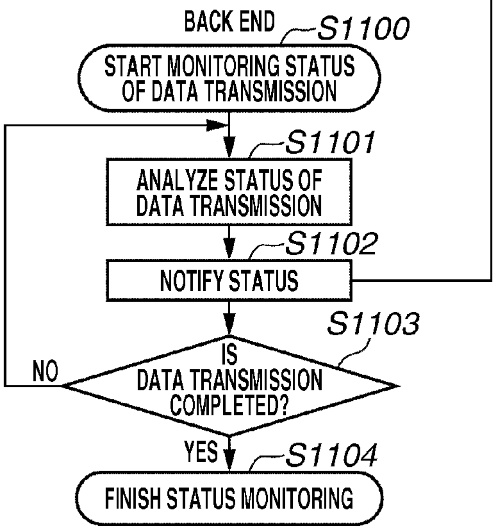
Figure 10C:
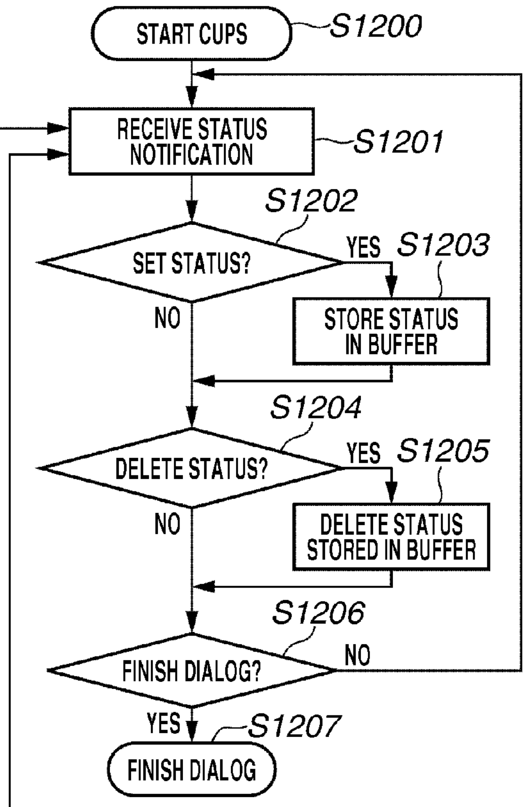

FIGS. 10A to 10C are flowcharts illustrating processing from a notification to storage of a status item. FIG. 10A illustrates processing performed by the printer driver 04. FIG. 10B illustrates back-end module processing performed by the I/F control unit 05 controlled by the OS. FIG. 10C illustrates processing performed by the job control unit 03.

The job control unit 03 accepts notifications transmitted from a plurality of modules during processing of a print job. According to the examples illustrated in FIGS. 10A to 10C, the job control unit 03 accepts status notifications from the printer driver 04 and a back end module.

When the job control unit 03 accepts the status notifications from these modules, it stores the status items in the status storage buffer 06 in the order of notification. Since the processing with respect to storage and deletion of a status item is similar to the processing performed in steps S301 to S305 in FIG. 2C of the first exemplary embodiment, their descriptions are not repeated.

In step S1000, when the processing of the print job is started, the printer driver 04 starts monitoring the status of the printer 20 and further sorts the status items stored in the status storage buffer 06 at regular intervals. In step S1001, the printer driver 04 acquires status information from the printer 20. In step S1002, the printer driver 04 analyzes the status information.

In step S1003, the printer driver 04 notifies the job control unit 03 of the status of the printer 20. After that, the printer driver 04 sorts the status items to be stored in the status storage buffer 06 according to the notification source.

In step S1004, the printer driver 04 determines whether the time that elapsed from the previous sorting is greater than a predetermined period of time. If the printer driver 04 determines that the time elapsed is greater than a predetermined period of time (NO in step S1004), the processing proceeds to step S1005. In step S1005, the printer driver 04 performs the sort processing. According to the present exemplary embodiment, the sort processing is performed, for example, every minute.

In step S1006, the printer driver 04 determines whether the print processing of the printer 20 has been completed. If the printer driver 04 determines that the print processing has been completed (YES in step S1006), the monitoring of the status ends. If not (NO in step S1006), the processing returns to step S1001, and the printer driver 04 continues the monitoring of the status and the sorting of the status items stored in the status storage buffer 06.

In step S1100, when the processing of the print job is started, the back-end module starts monitoring the status of the data transmission. In step S1101, the back-end module analyzes the status of the data transmission. In step S1102, the back-end module notifies the job control unit 03 of the status.

In step S1103, the back-end module determines whether the data transmission has been completed. If the back-end module determines that the transmission of the data to the printer 20 has been completed, and the request for data transmission sent from the printer driver 04 has been transmitted (YES in step S1103), the processing proceeds to step S1104, and the processing ends. If not (NO in step S1103), the processing returns to step S1101, and the monitoring of the status is continued.

Figure 11:
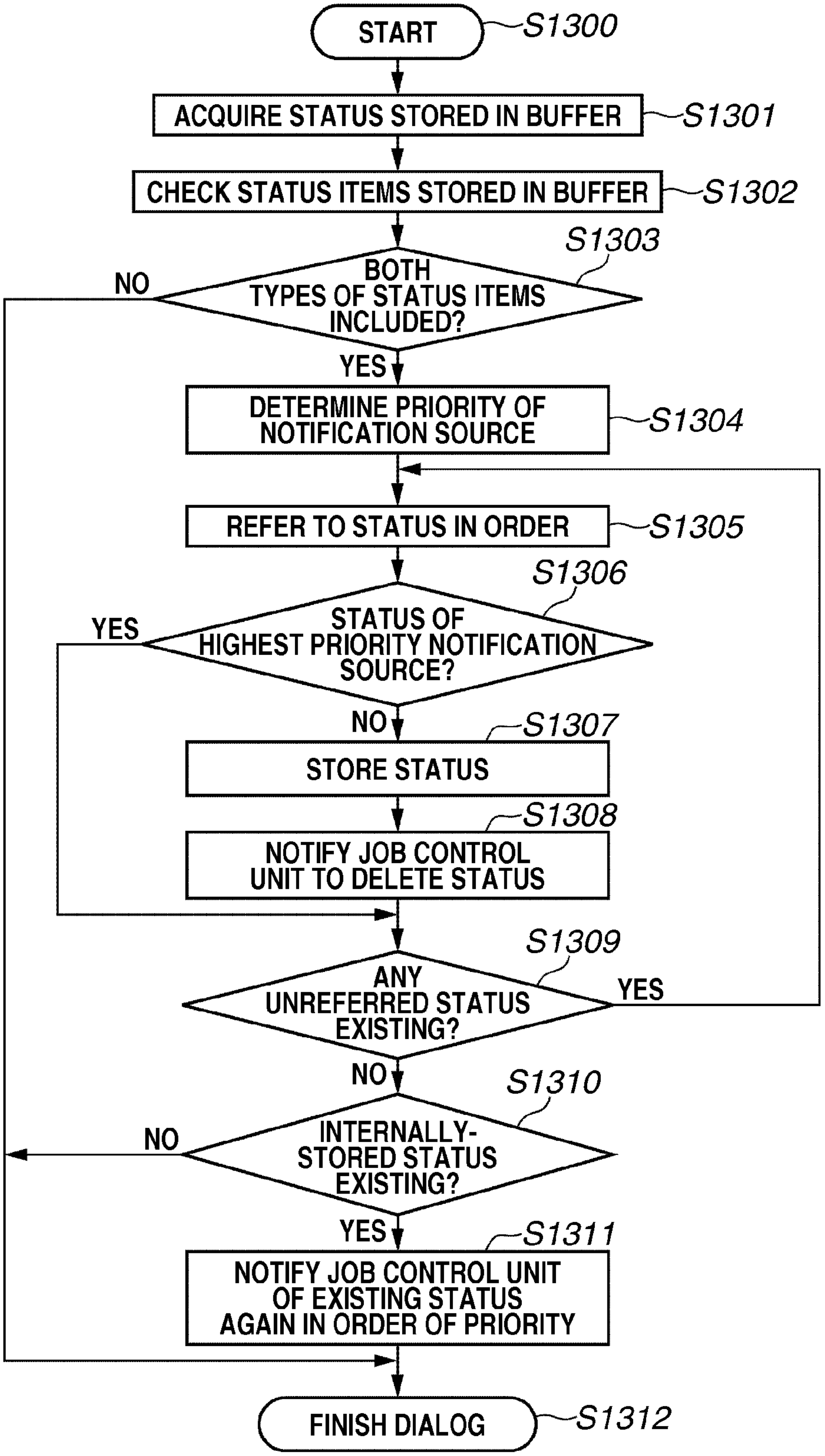
FIG. 11 is a flowchart illustrating details of the processing performed in step S1005 of FIG. 10A by the printer driver when the printer driver sorts the status items stored in the status storage buffer according to the notification sources.

FIG. 11 is a flowchart illustrating details of the processing performed in step S1005 in FIG. 10A by the printer driver 04 when the printer driver sorts the status items stored in the status storage buffer 06 according to the notification sources.

In step S1301, the printer driver 04 acquires the status items stored in the status storage buffer 06. In step S1302, the printer driver 04 checks the status items stored in the status storage buffer 06. In step S1303, the printer driver 04 determines whether a status item notified from a module other than the printer driver 04 is included as well as a status item notified by the printer driver 04. If the printer driver 04 determines that both types of status items are included (YES in step S1303), the processing proceeds to step S1304. In step S1304, the printer driver 04 determines the priority notification source. The priority notification source is used in determining the priority of the status items including the status item notified by the printer driver 04 and the status item notified by a different module after the sorting.

The printer driver 04 determines the priority according to whether the status notified by each notification source is a warning, a recoverable error, or an unrecoverable error. If the status is a recoverable error, the printer driver 04 determines the priority according to the operation procedures necessary in the recovery. The printer driver 04 internally holds information concerning priority order of each status item in advance (see FIG. 12).

In step S1305, the printer driver 04 refers to the status items in order. In step S1306, the printer driver 04 determines whether the status item being referred to is an item corresponding to the notification source of the highest priority. If the status is not from the notification source of the highest priority (NO in step S1306), the processing proceeds to step S1307. In step S1307, the printer driver 04 internally holds the status. In step S1308, the printer driver 04 notifies the job control unit 03 to delete the status item stored in the status storage buffer 06.

In step S1309, the printer driver 04 determines whether there is a status item acquired from the status storage buffer 06 and not referred to yet. If the printer driver 04 determines that such a status exists (YES in step S1309), the processing returns to step S1305, and the printer driver 04 refers to the next status. If the printer driver 04 determines that the status is from the notification source of the highest priority (YES in step S1306), the processing proceeds to step S1309 without notifying the job control unit 03 of clearance of the status.

On the other hand, in step S1309, if the printer driver 04 determines that all the status items are referred to (NO in step S1309), the processing proceeds to step S1310. In step S1310, the printer driver 04 determines whether a status item stored in step S1307 exists. If such a status item exists (YES in step S1310), the processing proceeds to step S1311. Instep S1311, the printer driver 04 notifies the job control unit 03 of the status items again in descending order of priority. In step S1310, if a status item stored in step S1307 does not exist (NO in step S1310), then the processing proceeds to step S1312. In step S1312, the processing ends.

In step S1303, if the printer driver 04 determines that a status notified by a module other than the driver does not exist (NO in step S1303), the processing proceeds to step S1312, and then the processing ends.

As described in the first exemplary embodiment, it is also possible to make the status display unit 07 acquire the last status item stored in the status storage buffer 06, acquire a message corresponding to the acquired status from a PPD file, and display the message in the display dialog box.

If the status display unit 07 performs such processing, in step S1306 in FIG. 11, the printer driver 04 determines whether the status item corresponds to the priority notification source. If the printer driver 04 determines that the status items corresponds to the priority notification source (YES in step S1306), the processing proceeds to step S1309. In step S411 in FIG. 4, the printer driver 04 may notify the job control unit 03 again of the stored status items in the ascending order.

FIG. 12 illustrates an example of a priority management table. According to the example illustrated in FIG. 12, the back-end module is used as a notification source other than the printer driver 04. The printer driver 04 refers to the table in step S1304 of the flowchart in FIG. 11, and determines the notification source that has given notification of the status item of the highest priority as the priority notification source.

Figures 13A, 13B:
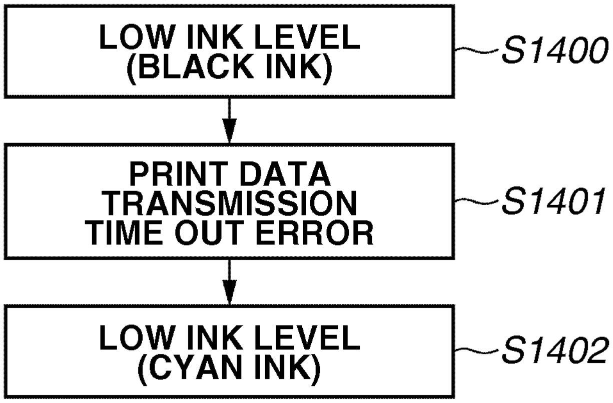
FIGS. 13A and 13B illustrate an example of a status transition and an example of a notification source.

FIGS. 13A and 13B illustrate an example of a status transition and an example of a notification source.

FIGS. 13A and 13B illustrate a case where a low ink level warning of black ink, a low ink level warning of cyan ink, and a data transmission time-out error of data to be transmitted to the printer 20 have occurred in the order illustrated in FIG. 13A. If the low black ink level warning or the low cyan ink level warning of the printer 20 occurs, the printer driver 04 notifies the job control unit 03 of the warning status.

On the other hand, if a trouble occurs with the data transmission to the printer 20, and a print data transmission time-out error occurs, the back-end module notifies the job control unit 03 that the transmission time out error has occurred. In FIG. 13A and 13B, the data transmission time-out error notified by the back-end module is given higher priority than the low ink level warning notified by the printer driver 04. When the data transmission time-out error occurs, the printer is unable to continue printing.

If the errors occur in the order illustrated in FIG. 13A, the printer driver 04 and the back-end module notifies the job control unit 03 of their status in order. The status display dialog box and the status storage buffer 06 when the notification is received are described below.

Figure 14A:
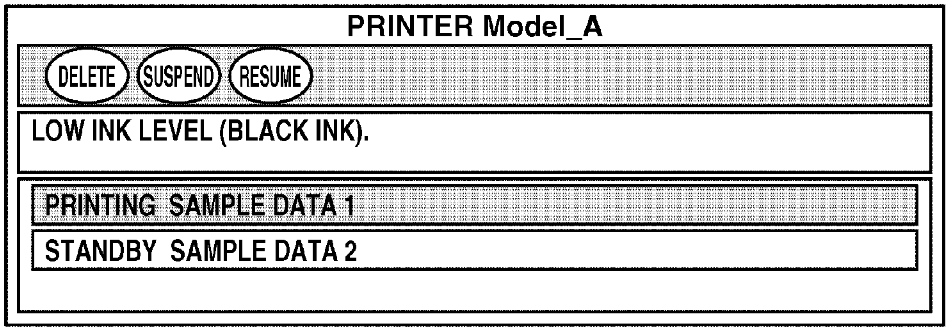
FIGS. 14A and 14B illustrate a state of the status display dialog box and a state of the status storage buffer performed in S1402 in FIG. 13A.
Figure 14B:
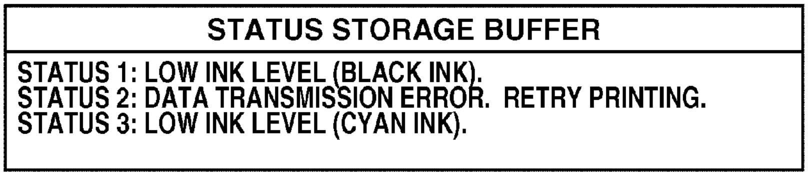

FIGS. 14A and 14B illustrate a state of the status display dialog box and a state of the status storage buffer in step S1402 of the flowchart in FIG. 13A.

If the printer 20 and the back-end module notify the job control unit 03 of their status in the order illustrated in FIG. 13A, the status items are stored in the status storage buffer 06 in that order (see FIG. 14B). The low black ink level warning, which is the first status item that has been notified, is displayed in the message display area (see FIG. 14A).

Figures 15A, 15B, 15C:
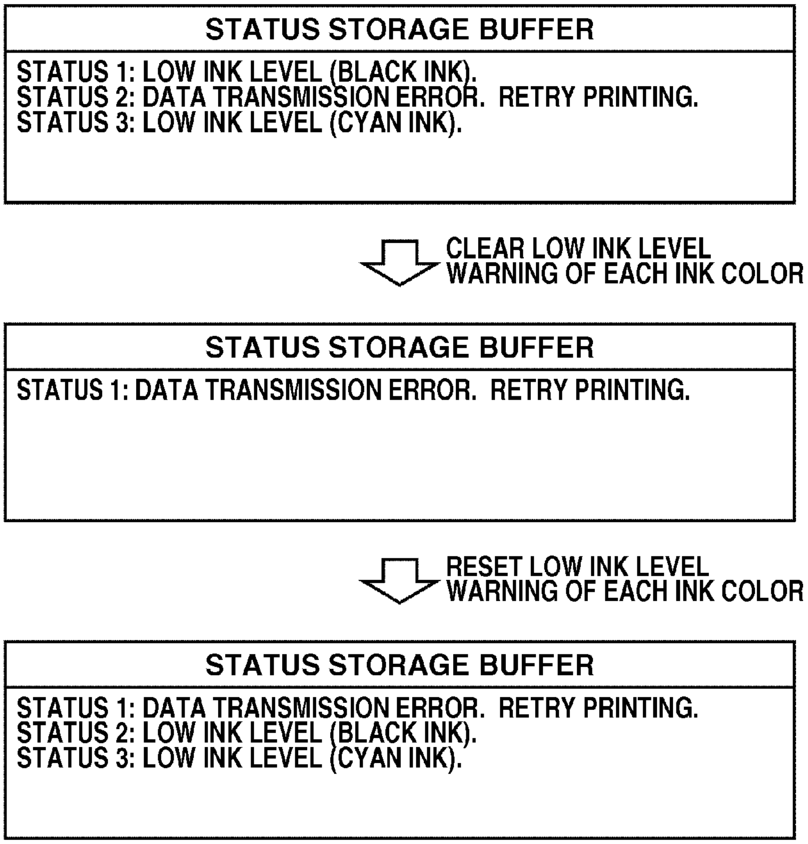
FIGS. 15A to 15C illustrate transition of the status storage buffer associated with the sort processing of the status storage buffer performed by the printer driver illustrated in FIG. 11.

FIGS. 15A to 15C illustrate transition of the status storage buffer 06 associated with the sort processing of the status storage buffer 06 performed by the printer driver 04 as illustrated in the flowchart in FIG. 11.

Since the data transmission time-out error notified by the back-end module is given higher priority compared to the low ink level warning notified by the printer driver 04, the printer driver 04 determines the back-end module as the priority notification source. Then, after internally storing the low ink level warning of the black ink and the cyan ink, which are status items notified by a module other than the back-end module, the printer driver 04 notifies the job control unit 03 to delete the status items from the status storage buffer 06.

On receiving the notification from the printer driver 04, the job control unit 03 deletes the status items from the status storage buffer 06 (see FIG. 15B).

After that, the printer driver 04 notifies the job control unit 03 again of the low ink level warning of the black ink and the cyan ink, which has once been stored and then deleted from the status storage buffer 06. On receiving the notification, the job control unit 03 stores the status items in the status storage buffer 06 in order (see FIG. 15C).

Figure 16A:
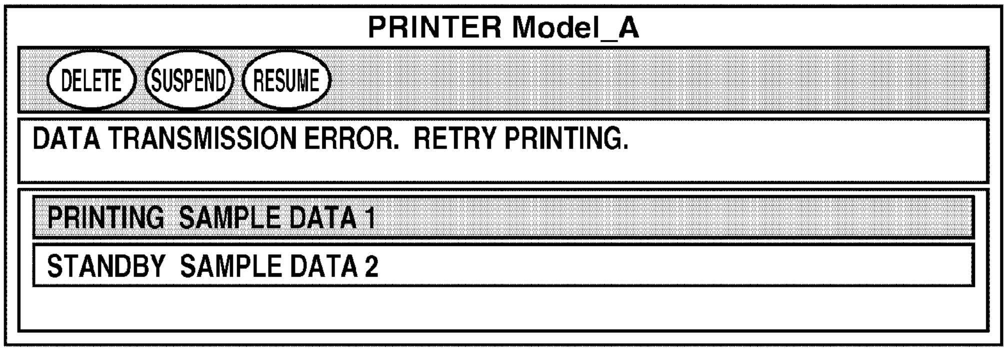
FIGS. 16A and 16B illustrate a state of the status display dialog box and the status storage buffer after the sort processing of the status storage buffer is performed by the printer driver as illustrated in FIG. 11.
Figure 16B:
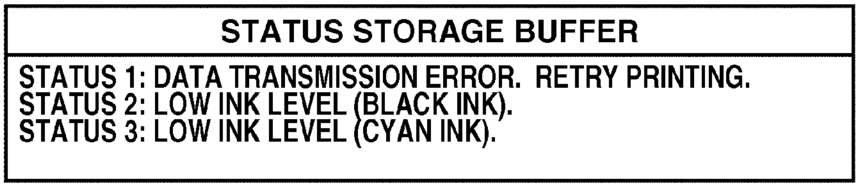

FIGS. 16A and 16B illustrate a state of the status display dialog box and a state of the status storage buffer 06 after the sort processing of the status storage buffer is performed by the printer driver 04 as illustrated in FIG. 11.

The status items notified by the printer driver 04 or the back-end module are sorted and stored in the status storage buffer 06. A status item notified by the back-end module and given the highest priority is stored first in the status storage buffer 06 (see FIG. 16B). Thus, a message corresponding to the status item notified by the back-end module and given the highest priority is displayed in the status display area (see FIG. 16A).

Further, according to the change in the status, the messages notified by the back-end module or the printer driver 04 are displayed in the status display area according to the storage order illustrated in FIG. 16B. In other words, when a warning or an error is cancelled, the status will not be displayed in the order of "low black ink level" warning→"data transmission time-out" error→"low cyan ink level" warning, but displayed in the order of "data transmission time-out" error→"low black ink level" warning→"low cyan ink level" warning. Since the messages of a similar type are sequentially displayed, the user can easily understand the state of the job.

Figures 17A, 17B:
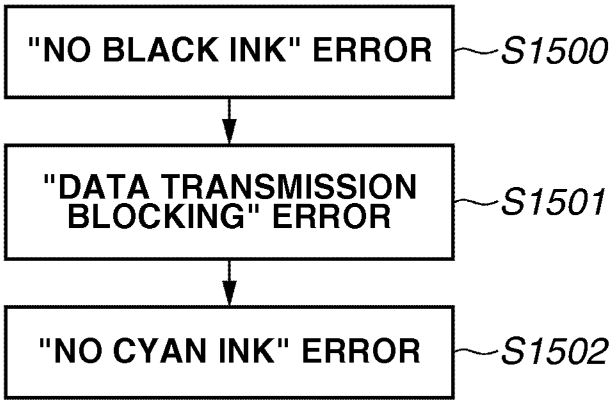
FIGS. 17A and 17B illustrate an example of a status transition and an example of a notification source.

FIGS. 17A illustrate an example of a status transition. FIG. 17B illustrates an example of a notification source. FIGS. 17A and 17B illustrate a case where the "no black ink" error, the "no cyan ink" error, and the "data transmission block" error of data to be transmitted to the printer 20 have occurred in the order illustrated in FIG. 17A.

If the "no black ink" error and the "no cyan ink" error occur with the printer 20, the printer driver 04 notifies the job control unit 03 of these errors. On the other hand, if the printer 20 does not accept data that has been transmitted, the back-end module notifies the job control unit 03 that a "transmission block" error has occurred.

FIGS. 17A and 17B illustrate a case where the printer 20 has blocked data transmitted from the PC01 due to the occurrence of the no ink error. Since the transmission of the data is blocked, the transmission block error is notified by the back-end module. Thus, the transmission block error notified by the back-end module is given lower priority compared to the no ink error notified by the printer driver 04.

If the errors occur in the order illustrated in FIG. 17A, the printer driver 04 and the back-end module notifies the job control unit 03 of their status in order. The states of the status display dialog and the status storage buffer 06 when the notification is received are described below.

Figures 18A, 18B:
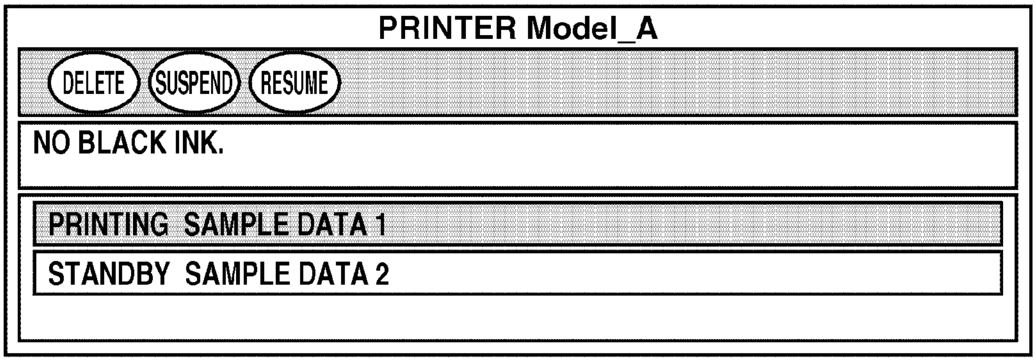
FIGS. 18A and 18B illustrate a state of the status display dialog box and a state of the status storage buffer in S1502 in FIG. 17A.

FIGS. 18A and 18B illustrate a state of the status display dialog box and a state of the status storage buffer 06 in step S1502 in FIG. 17A.

If the printer 20 and the back-end module notify the job control unit 03 of their status in the order illustrated in FIG. 17A, the status items are stored in the status storage buffer 06 in that order (see FIG. 18B). Then, the no black ink error is displayed in the message display area (see FIG. 18A).

Figures 19A, 19B, 19C:
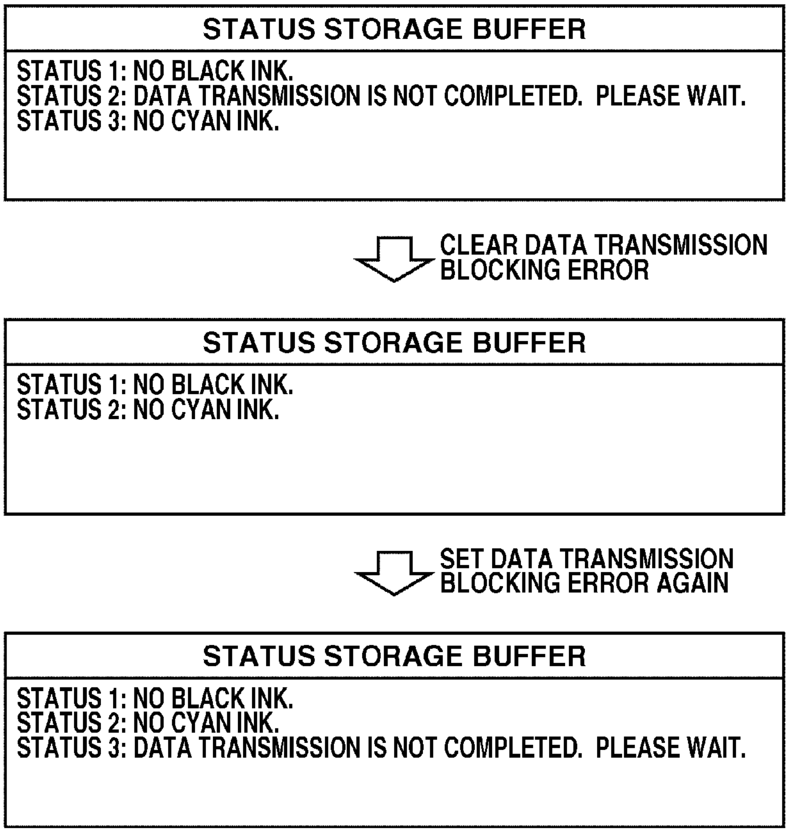
FIGS. 19A to 19C illustrate transition of the status storage buffer associated with the sort processing of the status storage buffer performed by the printer driver illustrated in FIG. 11.

FIGS. 19A to 19C illustrate transition of the status storage buffer 06 associated with the sort processing of the status storage buffer performed by the printer driver 04 illustrated in FIG. 11.

Since the transmission block error notified by the back-end module is given lower priority compared to the no ink error notified by the printer driver 04, the printer driver 04 determines itself as the priority notification source. Then, after internally storing the transmission block error, which is an error notified by a module other than the printer driver 04, the printer driver 04 notifies the job control unit 03 to delete the status item from the status storage buffer 06.

On receiving the notification from the printer driver 04, the job control unit 03 deletes the status item from the status storage buffer 06 (see FIG. 19B). After that, the printer driver 04 notifies the job control unit 03 again of the transmission block error, which has once been stored and then deleted from the status storage buffer 06. On receiving the notification, the job control unit 03 stores the status items in the status storage buffer 06 (see FIG. 19C) in order.

Figure 20A:
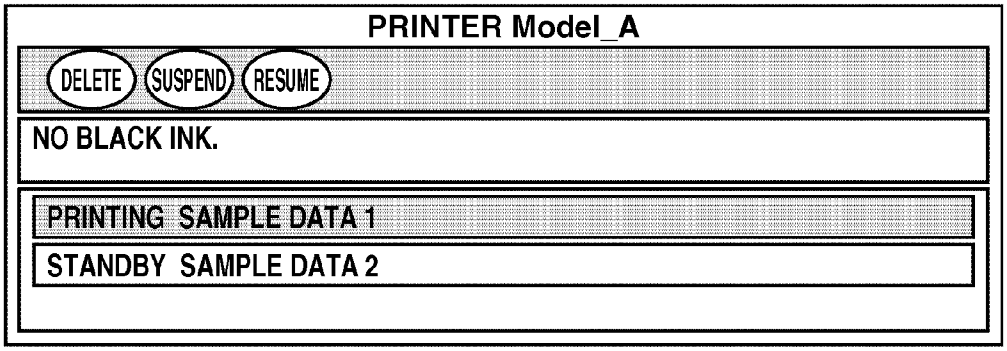
FIGS. 20A and 20B illustrate a state of the status display dialog box and the status storage buffer after the sort processing of the status storage buffer performed by the printer driver illustrated in FIG. 11.
Figure 20B:
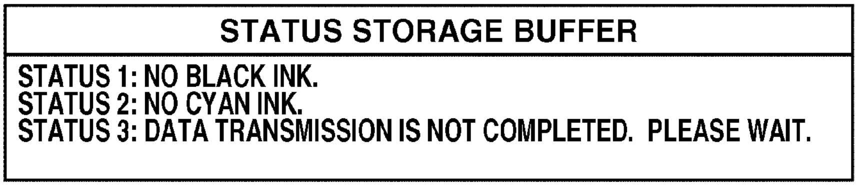

FIGS. 20A and 20B illustrate a state of the status display dialog box and a state of the status storage buffer 06 after the sort processing of the status storage buffer is performed by the printer driver 04 illustrated in FIG. 11.

The status items notified by the printer driver 04 or the back-end module are sorted and stored in the status storage buffer 06. A status item notified by the printer driver 04 and given the highest priority is stored first in the status storage buffer 06 (see FIG. 20B). Thus, a message corresponding to the status item notified by the printer driver 04 and given the highest priority is displayed in the status display area (see FIG. 20A).

Further, according to the change in the status, the messages notified by the back-end module or the printer driver 04 are displayed in the status display area according to the storage order illustrated in FIG. 20B. Since messages of a similar type are sequentially displayed, the user can easily understand the state of the job.

According to the present exemplary embodiment, the status items stored in the status storage buffer 06 are sorted at regular intervals based on the notification source. Thus, messages corresponding to the status items are displayed in the status display dialog in an order based on the notification source. In other words, according to the present exemplary embodiment, since the status items are sorted based on the notification source and displayed in order, the user can easily understand the related status.

Although the printer driver 04 and a back-end module are used as examples of a notification source of a status item according to the present exemplary embodiment, the notification source is not limited to such modules, and a different notification source is also available. Further, the priority of the status items can be set in advance according to the notification source. In this case, the printer driver 04 can sort the status items stored in the status storage buffer 06 at regular intervals according to the priority of the notification source.

Next, a third exemplary embodiment of the present invention will be described. Since the configurations of the printing system, the processing of the status display unit 07, and the status display dialog box are similar to those described in the first exemplary embodiment, their descriptions are not repeated.

Figure 21A:
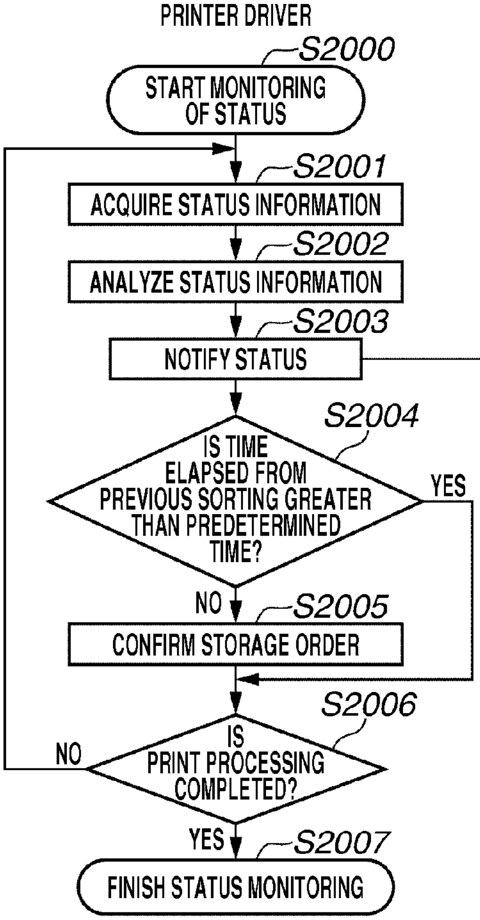
FIGS. 21A to 21C are flowcharts illustrating processing from a notification to storage of a status item.
Figure 21B:
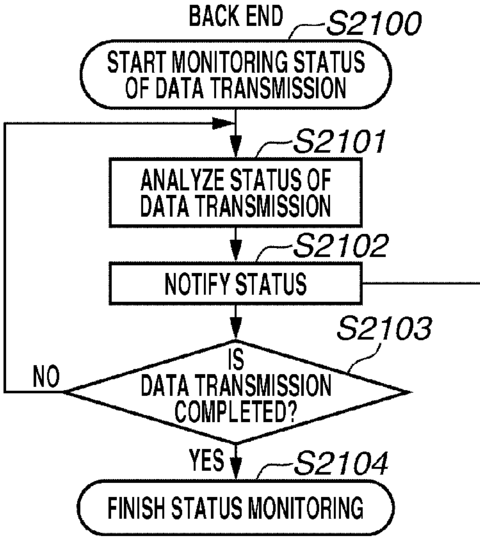
Figure 21C:
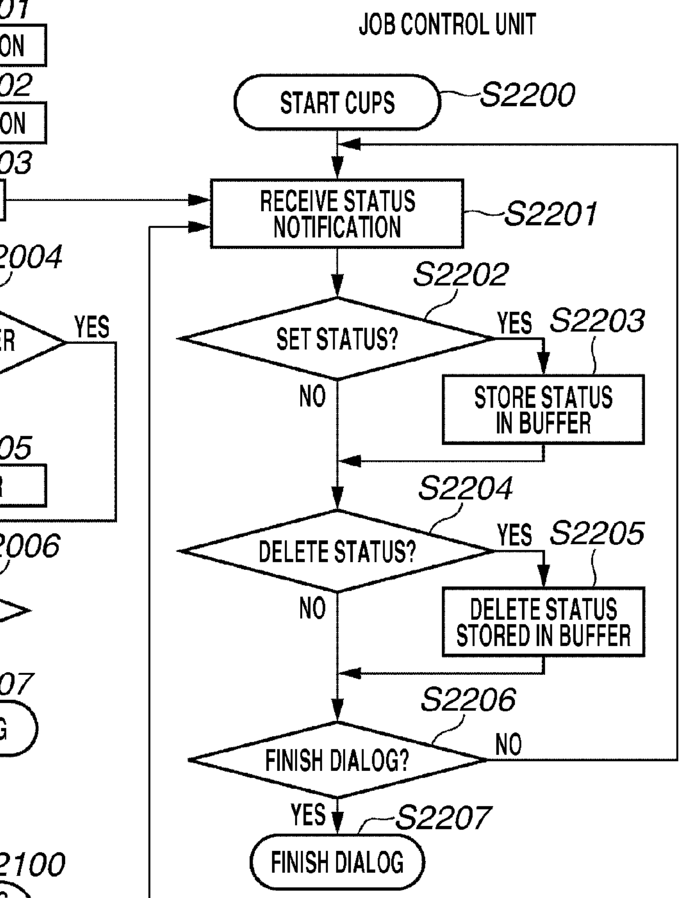

FIGS. 21A to 21C are flowcharts illustrating processing from a notification to storage of a status item. FIG. 21A illustrates processing performed by the printer driver 04. FIG. 21B illustrates processing performed by the back-end module. FIG. 21C illustrates processing performed by the job control unit 03.

In step S2000, when the processing of the print job is started, the printer driver 04 starts monitoring the status of the printer 20, and further confirms the order of the status items stored in the status storage buffer 06 at regular intervals. In step S2001, the printer driver 04 acquires status information from the printer 20. In step S2002, the printer driver 04 analyzes the status information. In step S2003, the printer driver 04 notifies the job control unit 03 of the status of the printer 20.

After that, the printer driver 04 sorts the status items to be stored in the status storage buffer 06 according to the priority. In step S2004, the printer driver 04 determines whether the time that elapsed from the previous confirmation of the storage order is greater than a predetermined period of time. If the printer driver 04 determines that the time is greater than a predetermined period of time (NO in step S2004), the processing proceeds to step S2005. In step S2005, the printer driver 04 confirms the storage order.

According to the present exemplary embodiment, the storage order is confirmed, for example, every minute. If the printer driver 04 determines that the print processing has been completed (YES in step S2006), the processing proceeds to step S2007, and the processing ends. If not (NO in step S2006), the processing returns to step S2001, and the printer driver 04 continues the monitoring of the status and the confirmation of the storage order of the status items stored in the status storage buffer 06.

Since the processing performed by the back-end module and the job control unit 03 is similar to the processing described in FIGS. 10B and 10C of the second exemplary embodiment, the descriptions of the processing are not repeated.

Figure 22:
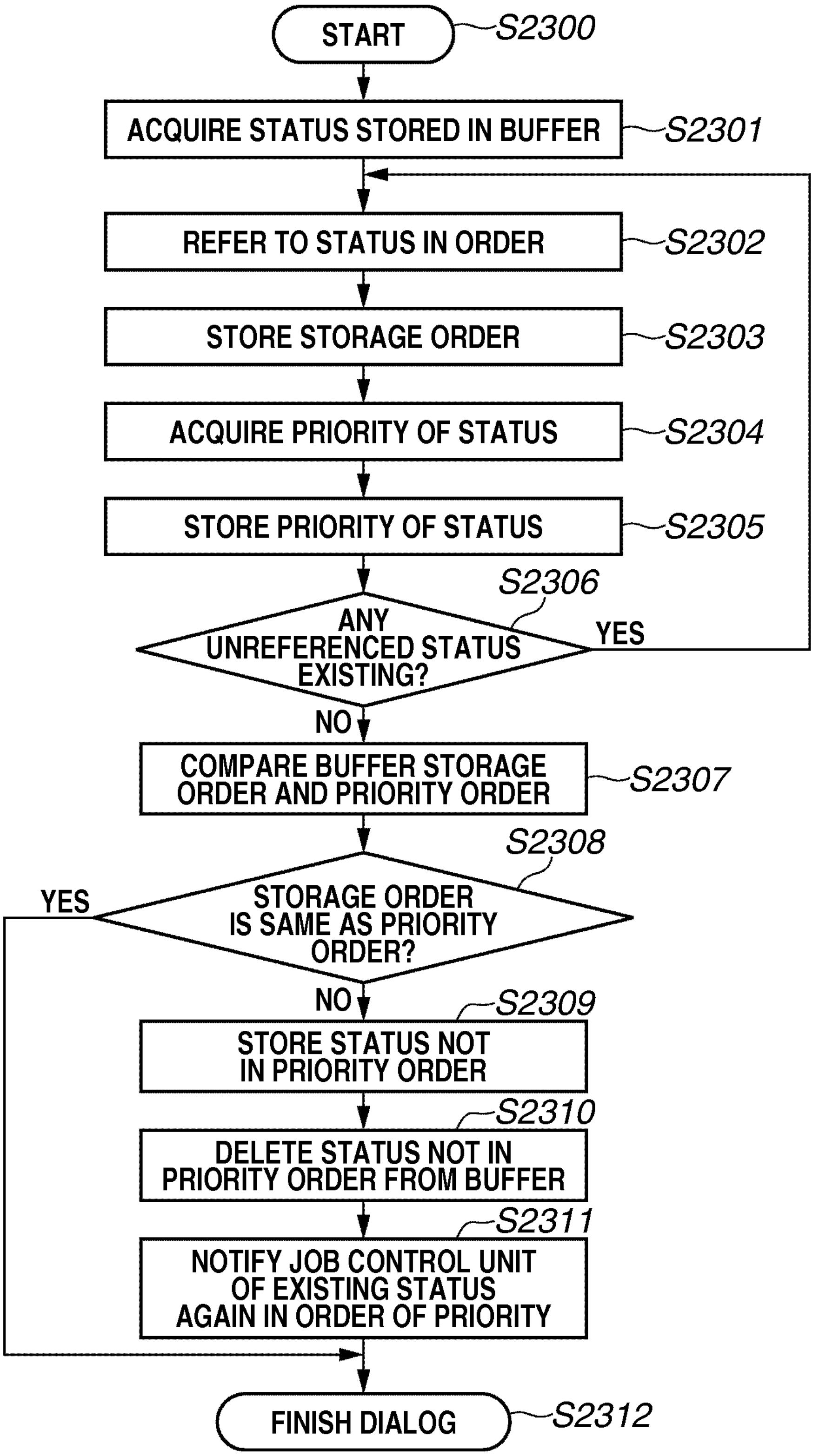
FIG. 22 is a flowchart illustrating details of the processing performed by the printer driver when the printer driver confirms the storage order of the status stored in the status storage buffer in step S2005 of the flowchart in FIG. 21A.

FIG. 22 is a flowchart illustrating details of the processing performed in step S2005 in FIG. 21A by the printer driver 04 when the printer driver confirms the storage order of the status items stored in the status storage buffer 06 according to a notification source.

In step S2301, the printer driver 04 acquires the status items stored in the status storage buffer 06. In step S2302, the printer driver 04 refers to the status items in order. In step S2303, the printer driver 04 acquires the storage order of the status items to be referred to in the status storage buffer 06 via the job control unit 03, and stores the storage order. In step S2304, the printer driver 04 acquires the priority of the status items and stores the priority.

The printer driver 04 determines the priority of the status items according to whether the status notified by each notification source is a warning, a recoverable error, or an unrecoverable error. If the status is a recoverable error, the printer driver 04 determines the priority according to the operation procedures necessary in the recovery. The printer driver 04 internally holds information concerning the priority order of each status item in advance.

In step S2306, the printer driver 04 determines whether there is a status item acquired from the status storage buffer 06 and not referred to yet. If the printer driver 04 determines that such a status exists (YES in step S2306), the processing returns to step S2302, and the printer driver 04 refers to the next status.

On the other hand, in step S2306, if the printer driver 04 determines that a status item that is not referred to yet exists (NO in step S2306), the processing proceeds to step S2307. In step S2307, after referring to all the status items acquired from the status storage buffer 06, the printer driver 04 compares the storage order and the priority order of the status items. In step S2308, the printer driver 04 determines whether the storage order and the priority order are different. If the printer driver 04 determines that the orders are different (YES in step S2308), the processing proceeds to step S2309. In step S2309, the printer driver 04 internally holds the status items, which are not in the order of the priority order.

In step S2310, the printer driver 04 notifies the job control unit 03 to delete the status items stored in the status storage buffer 06. In step S2311, the printer driver 04 notifies the job control unit 03 again according to the order of priority of the stored status items. In step S2312, the processing ends. In step S2308, if the printer driver 04 determines that the storage order and the priority order are the same (YES in step S2308), then the processing proceeds to step S2312, and the processing ends.

Figures 23A, 23B:
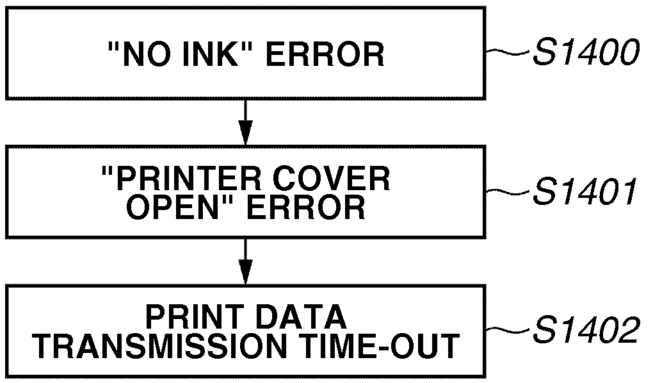
FIGS. 23A and 23B illustrate an example of a status transition and priority of the status items.

FIG. 23A illustrate an example of a status transition. FIG. 23B illustrates an example of the priority of the status items.

FIGS. 23A and 23B illustrate a case where the "no black ink" error, the "print cover open" error, and the "data transmission time-out" error of data to be transmitted to the printer 20 have occurred in the order illustrated in steps S1400 to S1402 in FIG. 23A. If the "no black ink" error and the "printer cover open" error occur with the printer 20, the printer driver 04 notifies the job control unit 03 of the status of the errors.

On the other hand, if a trouble occurs with the communication with the printer 20 and a print data transmission time-out error occurs, the back-end module notifies the job control unit 03 that the transmission time out error has occurred. In FIGS. 23A and 23B, the data transmission time-out error notified by the back-end module is given higher priority than the no ink error and the printer cover open error notified by the printer driver 04. When the data transmission time-out error occurs, the printer is unable to continue printing.

If the errors occur in the order illustrated in FIG. 23A, the printer driver 04 and the back-end module notifies the job control unit 03 of their status in order. The transition of the state of the storage buffer 06 when the status storage buffer 06 is notified of the status items by the above-described notification and by the printer driver 04 illustrated in FIG. 22, and the storage items are sorted will be described below.

Figures 24A, 24B, 24C:
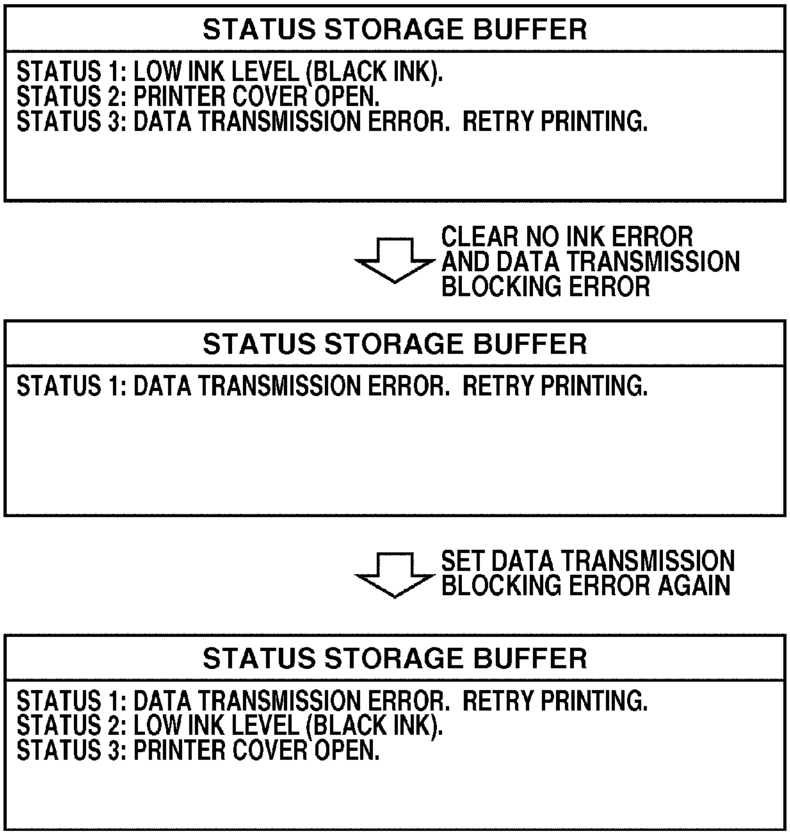
FIGS. 24A, 24B, and 24C illustrate a transition of a state of the status storage buffer from the state of S1402 in to a state caused by the processing of the printer driver in FIG. 22.

FIGS. 24A, 24B, and 24C illustrate a transition of a state of the status storage buffer 06 from the state of step S1402 in FIG. 23A to a state caused by the processing of the printer driver 04 in FIG. 22.

If the printer driver 04 detects that the data transmission time-out error, which is given higher priority than the no ink error or the printer cover open error, is subsequently stored, then the printer driver 04 notifies the job control unit 03 to delete the no ink error and the printer cover open error from the status storage buffer 06.

On receiving the notification from the printer driver 04, the job control unit 03 deletes the status items from the status storage buffer 06 (see FIG. 24B). After that, the printer driver 04 notifies the job control unit 03 again of the no ink error and the printer cover open error that the printer driver 04 internally stored for a time. The job control unit 03 stores these status items in the status storage buffer 06 in order (see FIG. 24C).

According to the present exemplary embodiment, since the status items stored in the status storage buffer 06 are sorted according to priority at regular intervals, the messages can be displayed in the status display dialog box in descending order of priority. In other words, according to the present exemplary embodiment, the status items can be displayed in the status display dialog box in descending order of priority, and the user will be informed of the status items in descending order of importance.

Figure 25:
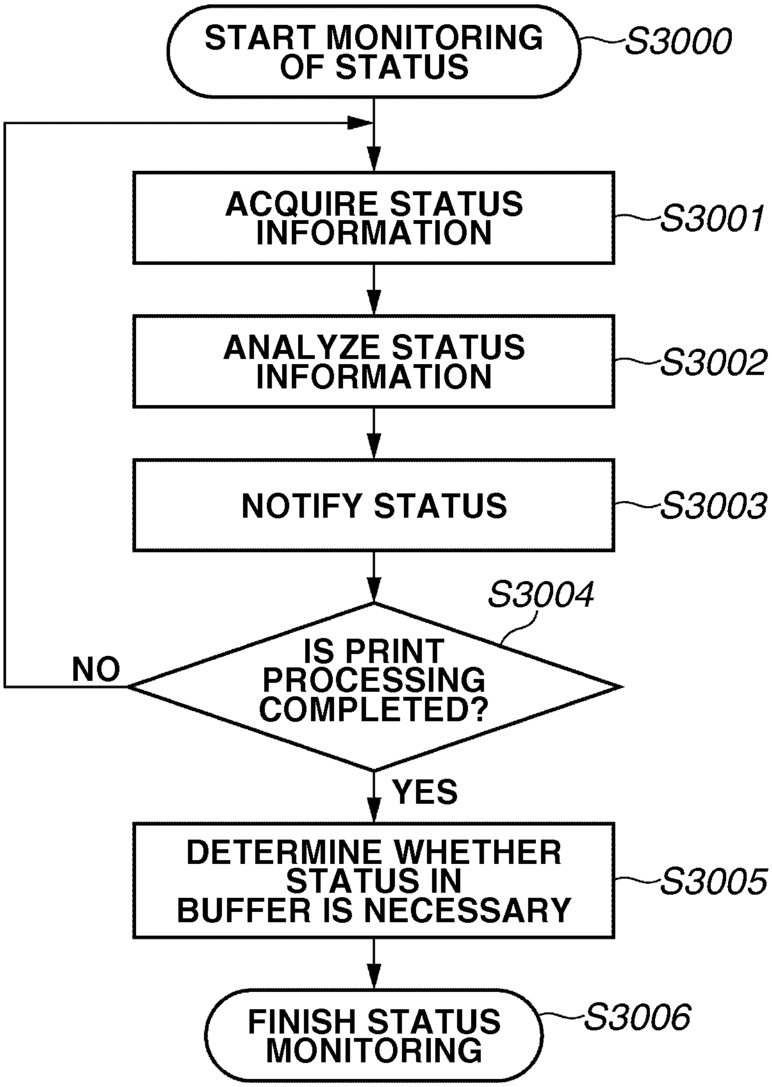
FIG. 25 is a flowchart illustrating notification processing of a status from a start to an end of a print job.

Next, a fourth exemplary embodiment of the present invention will be described. Since the configurations of the printing system, the processing of the status display unit 07, and the status display dialog box are similar to those described in the first exemplary embodiment, their descriptions are not repeated. FIG. 25 is a flowchart illustrating notification processing of a status from a start to an end of a print job.

In step S3000, when the processing of the print job is started, the printer driver 04 starts monitoring the status of the printer 20. The monitoring is continued until the print processing is completed. In step S3001, the printer driver 04 acquires status information from the printer 20. In step S3002, the printer driver 04 analyzes the status information. In step S3003, the printer driver 04 notifies the job control unit 03 of the status of the printer 20. In step S3004, the printer driver 04 determines whether the print processing of the printer 20 is completed. If the printer driver 04 determines that the print processing is completed (YES in step S3004), the processing proceeds to step S3005. In step S3005, the printer driver 04 determines whether it is necessary to display the message corresponding to the status item that remains in the status storage buffer 06 even after the printing is completed. In step S3004, if the printer driver 04 determines that the print processing is still not completed (NO in step S34), the processing returns to step S3001.

Figure 26:
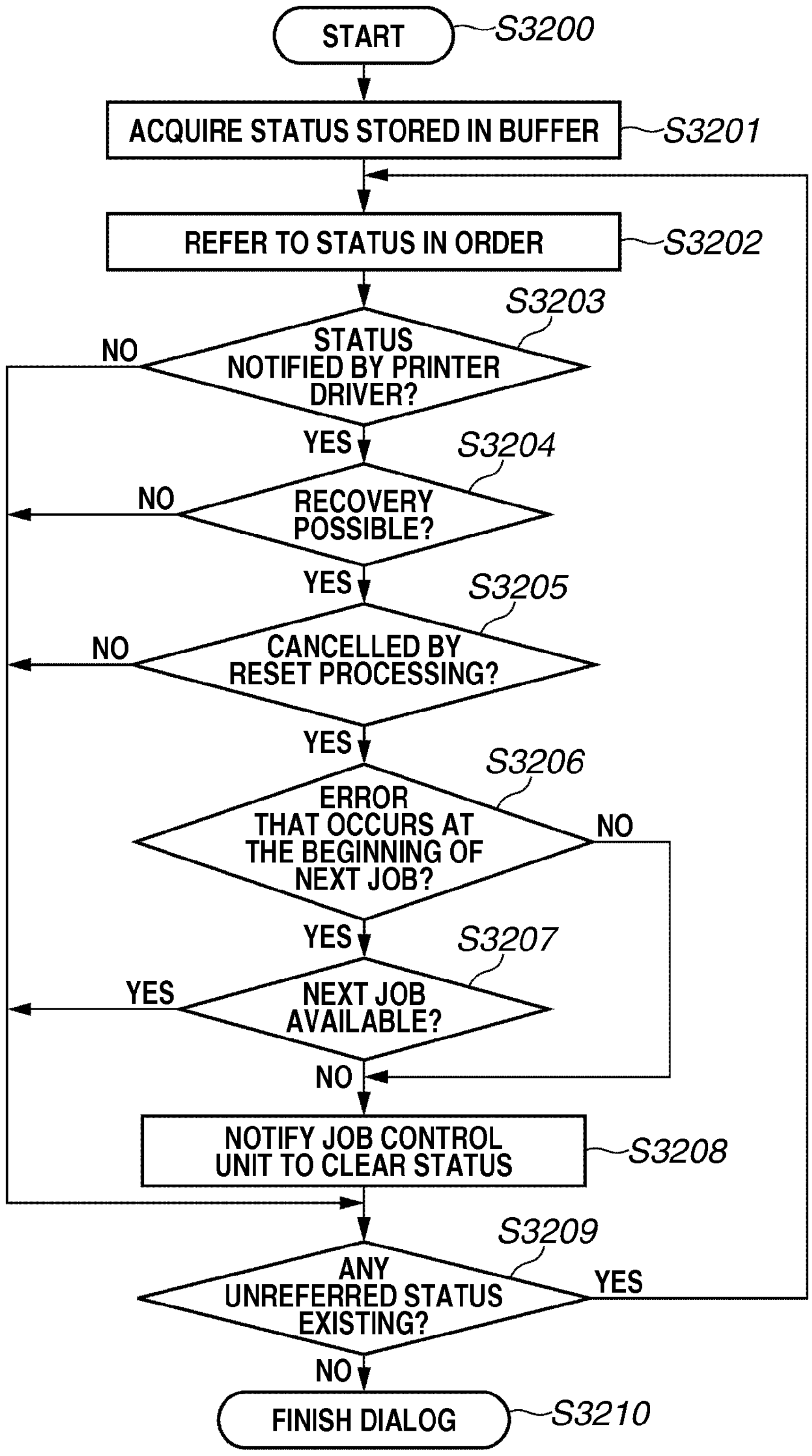
FIG. 26 is a flowchart illustrating detailed processing of the printer driver determining whether the status item that remains in the status storage buffer when the printing is completed is necessary with respect to step S3005 in FIG. 25.

FIG. 26 is a flowchart illustrating detailed processing of the printer driver 04 determining whether the status item that remains in the status storage buffer 06 when the printing is completed is necessary in step S3005 in FIG. 25.

In step S3201, the printer driver 04 acquires the status items stored in the status storage buffer 06. In step S3202, the printer driver 04 refers to the status items in order. In step S3203, the printer driver 04 determines whether the status items are the items notified by itself. If the status items are the items notified by the printer driver 04 (YES in step S3203), the processing proceeds to step S3204.

If not (NO in step S3203), the processing proceeds to step S3209. In step S3209, the printer driver 04 determines whether there is a status item acquired from the status storage buffer 06 and not referred to yet. If the printer driver 04 determines that such a status item exists (YES in step S3209), the processing returns to step S3202, and the printer driver 04 refers to the next status item.

In steps S3204 to S3207, the printer driver 04 determines whether display of the status item is necessary even after the printing is completed according to the details of the status item and the state of the print queue. If the status is an unrecoverable error (NO in step S3204) or an error that cannot be cancelled by the reset processing of the printer 20 performed when the printing is completed (NO in step S3205), the printer driver 04 determines that the status item is an error that needs to be displayed even after the printing is completed, and the processing proceeds to step S3209.

If the status is a recoverable error (YES in step S3204) and an error that can be cancelled by the reset processing of the printer 20 performed when the printing is completed (YES in step S3205), the processing proceeds to step S3206. Further, if the status is an error that occurs first when a next job is started (YES in step S3206), and if the next job is in the print queue (YES in step S3207), the printer driver 04 determines that the error needs to be displayed even after the printing is completed, and the processing proceeds to step S3209. If not (NO in step S3206, or NO in step S3207), the printer driver 04 determines that the display of the error is unnecessary after the printing is completed. In step S3208, the printer driver 04 notifies the job control unit 03 to delete the status item, and the processing proceeds to step S3209.

As described above, according to the present exemplary embodiment, it is determined whether the message displayed in the status display dialog, when the printing is completed, is necessary even after the printing is completed. If the message is determined as unnecessary, it can be cleared. In other words, according to the present exemplary embodiment, by clearing the unnecessary display of the error status after the printing is completed, a message that is unnecessary for the user will no longer be displayed. This contributes to improving operability of the user.

The object of the present invention can also be achieved by supplying a storage medium storing software program code which is configured to realize a function of the above-described exemplary embodiments, to a system or an apparatus and reading out and executing the program code stored in the storage medium by a system or a computer (or CPU or MPU) of the apparatus.

According to the above-described exemplary embodiments, a status of a printing apparatus can be appropriately displayed.

While the present invention has been described with reference to exemplary embodiment, it is to be understood that the invention is not limited to the disclosed exemplary embodiments and includes various modifications of the embodiments in the scope of the following claims. Further, a combination of the above-described exemplary embodiments also constitutes the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-181856 filed Aug. 4, 2009, which is hereby incorporated by reference herein in its entirety.

What is claimed is:

1. An information processing apparatus comprising:

a determination unit configured to determine which is higher either priority of an existing status item stored in a storage region or priority of a new status item to be stored in the storage region; and a storage unit configured to delete the existing status item from the storage region, store the new status item in the storage region so as to precede the existing status item in a storage order, and store the existing status item in the storage region so as to follow the new status item in the storage order after the storing of the new status item in the storage region if the determination unit determines that the priority of the new status item is higher than the priority of the existing status item, wherein the status item stored in the storage region is displayed in accordance with the storage order and the new status item is displayed if the priority of the new status item is higher than the priority of the existing status item.

2. The information processing apparatus according to claim 1, wherein the storage unit stores the existing status item and the new status item in the storage region in descending order of priority.

3. The information processing apparatus according to claim 1, wherein the storage unit acquires the existing item stored in the storage region, store the acquired status item and the new status item in the storage region at regular intervals.

4. The information processing apparatus according to claim 1, further comprising: a second storage unit configured to acquire the existing status item stored in the storage region, compares priority of the existing status item with priority of another existing status item if the storage order of the existing status item is not in descending order of priority, deleting the existing status item from the storage region, and store the existing status item in the storage region in descending order of priority.

5. The information processing apparatus according to claim 1, wherein the determination unit determines the priority of the status item according to a state of print processing indicated by the status item.

6. The information processing apparatus according to claim 1, wherein if a state of print processing indicated by the status item is an error, the storage unit determines the priority of the status item according to operation procedure information concerning recovery from error that is set for each error.

7. The information processing apparatus according to claim 1 further comprising a second determination unit configured to determine whether the existing status item is necessary after print processing is completed, wherein the storage unit deletes, if the second determination unit determined the status item is unnecessary after the print processing is completed, the status item from the storage region.

8. The information processing apparatus according to claim 1, further comprising:

a third storage unit configured to store the new status item in the storage region so as to follow the existing status item in the storage order if the determination unit determines that the priority of the new status item is lower than the priority of the existing status item.

9. The information processing apparatus according to claim 1, wherein the storage unit does not delete the existing status item from the storage region and stores the new status item in the storage region to follow the existing status in the storage order if the determination unit determines that priority of the new status item is lower than priority of the existing status item.

10. The information processing apparatus according to claim 1, wherein the storage unit does not delete the existing status item from the storage region and stores the new status item in the storage region to follow the existing status in the storage order if the determination unit determines that the priority of the new status item is higher than priority of the existing status item.

11. An information processing method comprising:

determining which is higher either priority of an existing status item stored in a storage region or priority of a new status item to be stored in the storage region; and deleting the existing status item from the storage region, storing the new status item in the storage region so as to precede the existing status item in a storage order, and storing the existing status item in the storage region so as to follow the new status item in the storage order after the storing of the new status item in the storage region if it is determined that the priority of the new status item is higher than the priority of the existing status item, wherein the status item stored in the storage region is displayed in accordance with the storage order and the new status item is displayed if the priority of the new status item is higher than the priority of the existing status item.

12. A non-transitory computer-readable storage medium storing a computer-executable process, the computer-executable process causing a computer to execute an information processing method comprising:

determining which is higher either priority of an existing status item stored in a storage region or priority of a new status item to be stored in the storage region; and deleting the existing status item from the storage region, storing the new status item in the storage region so as to precede the existing status item in a storage order, and storing the existing status item in the storage region so as to follow the new status item in the storage order after the storing of the new status item in the storage region if it is determined that the priority of the new status item is higher than the priority of the existing status item, wherein the status item stored in the storage region is displayed in accordance with the storage order and the new status item is displayed if the priority of the new status item is higher than the priority of the existing status item.

13. An information processing apparatus comprising:

a determination unit configured to determine which is higher either priority of an existing status item stored in a storage region or priority of a new status item to be stored in the storage region; and a storage unit configured to delete the existing status item from the storage region, store the new status item in the storage region so as to precede the existing status item in an storage order, and store the existing status item in the storage region so as to follow the new status item in the storage order after the storing the new status item in the storage region if the determination unit determines that the priority of the new status item is lower than the priority of the existing status item, wherein the status item stored in the storage region is displayed in accordance with the storage order and the new status item is displayed if the priority of the new status item is higher than the priority of the existing status item.

14. The information processing apparatus according to claim 13, wherein the storage unit stores the existing status item and the new status item in the storage region in ascending order of priority.

15. The information processing apparatus according to claim 13 further comprising a second storage unit configured to acquire the existing item stored in the storage region, compares priority of the existing status item with priority of another existing status item if the storage order of the existing status item is not in ascending order of priority, and store the existing status item in the storage region in ascending order of priority.

16. The information processing apparatus according to claim 13, further comprising:

a third storage unit configured to store the new status item in the storage region so as to follow the existing status item in the storage order if the determination unit determines that the priority of the new status item is higher than the priority of the existing status item.

17. An information processing method comprising:

determining which is higher either priority of an existing status item stored in a storage region or priority of a new status item to be stored in the storage region; and deleting the existing status item from the storage region, storing the new status item in the storage region so as to precede the existing status items in an storage order, and storing the existing status item in the storage region so as to follow the new status item in the storage order after the storing of the new status item in the storage region if it is determined that the priority of the new status item is lower than the priority of the existing status item, wherein the status item stored in the storage region is displayed in accordance with the storage order and the new status item is displayed if the priority of the new status item is higher than the priority of the existing status item.

18. The method according to claim 17, wherein in the deleting step the existing status item is not deleted from the storage region and, the new status item is stored in the storage region to follow the existing status in the storage order if it is determined that priority of the new status item is lower than priority of the existing status item.

19. A non-transitory computer-readable storage medium storing a computer-executable process, the computer-executable process causing a computer to execute the method according to claim 18.

20. The method according to claim 17, wherein in the deleting step the existing status item is not deleted from the storage region and the new status item is stored in the storage region to follow the existing status in the storage order if it is determined that the priority of the new status item is higher than priority of the existing status item.

21. A non-transitory computer-readable storage medium storing a computer-executable process, the computer-executable process causing a computer to execute the method according to claim 20.

22. A non-transitory computer-readable storage medium storing a computer-executable process, the computer-executable process causing a computer to execute an information processing method comprising:

determining which is higher either priority of an existing status item stored in a storage region or priority of a new status item to be stored in the storage region; and deleting the existing status item from the storage region, storing the new status item in the storage region so as to precede the existing status items in an storage order, and storing the existing status item in the storage region so as to follow the new status item in the storage order after the storing of the new status item in the storage region if it is determined that the priority of the new status item is lower than the priority of the existing status item, wherein the status item stored in the storage region is displayed in accordance with the storage order and the new status item is displayed if the priority of the new status item is higher than the priority of the existing status item.

* * * * *